(12) United States Patent
Ilea

(10) Patent No.: US 11,306,517 B2
(45) Date of Patent: Apr. 19, 2022

(54) DUAL MOTOR DEVICE WITH APPLICATION TO POWER CINCH AND LATCH MECHANISM

(71) Applicant: Magna Closures Inc., Newmarket (CA)

(72) Inventor: Ioan Dorin Ilea, Vaughan (CA)

( * ) Notice: Subject to any disclaimer, the term of this patent is extended or adjusted under 35 U.S.C. 154(b) by 0 days.

(21) Appl. No.: 14/996,537

(22) Filed: Jan. 15, 2016

(65) Prior Publication Data
US 2016/0186468 A1 Jun. 30, 2016

Related U.S. Application Data

(63) Continuation of application No. PCT/CA2014/000572, filed on Jul. 17, 2014.
(Continued)

(30) Foreign Application Priority Data

May 13, 2014 (WO) ................ PCT/CA2014/000425

(51) Int. Cl.
*E05B 81/06* (2014.01)
*E05B 79/20* (2014.01)
(Continued)

(52) U.S. Cl.
CPC .......... *E05B 81/06* (2013.01); *B60N 2/01516* (2013.01); *B60N 2/366* (2013.01);
(Continued)

(58) Field of Classification Search
CPC .......... E05B 79/04; E05B 79/20; E05B 81/14; E05B 81/34; E05B 81/42; E05B 81/06; E05B 83/13; E05B 81/20; E05B 83/18; E05B 83/24; E05B 2047/0013; B60N 2/01516; B60N 2/366; B60N 2002/0236;
(Continued)

(56) References Cited

U.S. PATENT DOCUMENTS

| 3,843,175 A | * | 10/1974 | Klebba | ................ | E05B 85/243 |
| | | | | | 292/216 |
| 4,575,138 A | * | 3/1986 | Nakamura | ............ | E05B 77/265 |
| | | | | | 292/216 |

(Continued)

FOREIGN PATENT DOCUMENTS

| CA | 2576211 C | 2/2006 |
| DE | 195 35 065 A1 | 3/1997 |

(Continued)

OTHER PUBLICATIONS

International Search Report & Written Opinion dated Oct. 15, 2014 relating to corresponding PCT International Application No. PCT/CA2014/000572 issued from the Canadian Intellectual Property Office.

*Primary Examiner* — Christine M Mills
*Assistant Examiner* — Faria F Ahmad

(57) ABSTRACT

A rotary drive actuation system for actuating a latch including: an output shaft having a member affixed at one end of the output shaft for coupling to a component of the latch; a common drive element affixed to the output shaft at the other end of the output shaft; and a plurality of motors coupled to the common drive element for simultaneously driving the common drive element and the output shaft in a first rotary direction to effect actuation of the latch.

21 Claims, 17 Drawing Sheets

Related U.S. Application Data

(60) Provisional application No. 61/847,249, filed on Jul. 17, 2013, provisional application No. 61/949,647, filed on Mar. 7, 2014.

(51) Int. Cl.
| | | |
|---|---|---|
| *E05B 81/34* | (2014.01) | |
| *E05B 81/42* | (2014.01) | |
| *E05B 81/20* | (2014.01) | |
| *E05B 83/18* | (2014.01) | |
| *E05B 81/14* | (2014.01) | |
| *E05B 83/24* | (2014.01) | |
| *B60N 2/36* | (2006.01) | |
| *B60N 2/015* | (2006.01) | |
| *E05B 79/04* | (2014.01) | |
| *E05C 3/12* | (2006.01) | |
| *E05B 47/00* | (2006.01) | |
| *B60N 2/02* | (2006.01) | |

(52) U.S. Cl.
CPC .............. *E05B 79/04* (2013.01); *E05B 79/20* (2013.01); *E05B 81/14* (2013.01); *E05B 81/20* (2013.01); *E05B 81/34* (2013.01); *E05B 81/42* (2013.01); *E05B 83/18* (2013.01); *E05B 83/24* (2013.01); *E05C 3/12* (2013.01); *B60N 2002/0236* (2013.01); *E05B 2047/0013* (2013.01); *Y10S 292/23* (2013.01); *Y10S 292/65* (2013.01); *Y10T 292/083* (2015.04); *Y10T 292/0854* (2015.04); *Y10T 292/0855* (2015.04); *Y10T 292/0856* (2015.04); *Y10T 292/0911* (2015.04); *Y10T 292/0945* (2015.04); *Y10T 292/1043* (2015.04); *Y10T 292/1047* (2015.04); *Y10T 292/1069* (2015.04); *Y10T 292/1071* (2015.04); *Y10T 292/1075* (2015.04); *Y10T 292/1082* (2015.04); *Y10T 292/1092* (2015.04)

(58) Field of Classification Search
CPC ......... Y10T 292/1082; Y10T 292/1047; Y10T 292/1043; Y10T 292/1075; Y10T 292/1069; Y10T 292/1071; Y10T 292/1092; Y10T 292/0854; Y10T 292/0855; Y10T 292/0911; Y10T 292/0945; Y10T 292/0856; Y10T 292/083; Y10T 292/068; E05C 3/12; Y10S 292/23; Y10S 292/65
USPC ........ 292/201, 216, DIG. 23, 49, 50, 51, 95, 292/96, 28, 194, 195, 234, 235, 237
See application file for complete search history.

(56) References Cited

U.S. PATENT DOCUMENTS

| | | | | | |
|---|---|---|---|---|---|
| 4,702,117 | A | * | 10/1987 | Tsutsumi | E05B 81/25 254/230 |
| 4,848,809 | A | * | 7/1989 | Escaravage | E05B 81/20 292/11 |
| 4,885,954 | A | * | 12/1989 | Wanlass | E05B 81/25 356/73.1 |
| 4,907,474 | A | * | 3/1990 | Bolger | F16H 33/185 475/14 |
| 5,316,365 | A | * | 5/1994 | Kuhlman | B60J 5/06 296/155 |
| 5,549,337 | A | * | 8/1996 | McCulloch | E05B 47/0012 292/201 |
| 5,618,068 | A | * | 4/1997 | Mitsui | E05B 81/20 292/201 |
| 5,737,876 | A | * | 4/1998 | Dowling | F16H 19/00 49/360 |
| 5,833,301 | A | * | 11/1998 | Watanabe | E05F 15/646 296/155 |
| 5,921,612 | A | * | 7/1999 | Mizuki | B60J 5/12 292/341.16 |
| 6,026,705 | A | * | 2/2000 | Ficyk | F16C 1/101 292/195 |
| 6,053,542 | A | * | 4/2000 | Ostrowski | E05B 81/20 292/201 |
| 6,065,316 | A | * | 5/2000 | Sato | E05B 81/06 292/201 |
| 6,069,420 | A | * | 5/2000 | Mizzi | F15B 11/128 310/15 |
| 6,199,322 | B1 | * | 3/2001 | Itami | E05F 15/638 192/12 B |
| 6,540,269 | B2 | * | 4/2003 | Wurges | E05C 17/60 292/125 |
| 6,629,710 | B1 | * | 10/2003 | Shafry | B60N 2/01583 292/216 |
| 6,779,372 | B2 | * | 8/2004 | Arlt | E05B 81/14 292/DIG. 23 |
| 6,805,386 | B2 | * | 10/2004 | Ehret | E05B 81/20 292/141 |
| 6,942,260 | B2 | * | 9/2005 | Bucker | E05B 77/02 292/336.3 |
| 6,988,749 | B2 | * | 1/2006 | Hashiba | E05B 81/14 292/201 |
| 7,003,915 | B2 | * | 2/2006 | Yokomori | E05F 15/603 49/280 |
| 7,014,228 | B2 | * | 3/2006 | Hirai | B62D 25/12 292/201 |
| 7,175,228 | B2 | * | 2/2007 | Mrkovic | E05B 81/20 192/35 |
| 7,270,029 | B1 | | 9/2007 | Papanikolaou et al. | |
| 7,434,853 | B2 | * | 10/2008 | Yamamoto | E05B 81/14 292/201 |
| 7,472,944 | B2 | * | 1/2009 | Miyagawa | B60J 5/06 296/155 |
| 7,478,845 | B2 | * | 1/2009 | Mankame | E05B 47/0009 292/201 |
| 7,537,249 | B2 | * | 5/2009 | Ichinose | E05B 81/14 292/201 |
| 7,575,270 | B2 | * | 8/2009 | Nagai | E05B 81/20 296/146.4 |
| 7,627,986 | B2 | * | 12/2009 | Hirai | E05B 81/22 49/280 |
| 7,671,719 | B2 | * | 3/2010 | Sogo | G06F 21/31 340/5.73 |
| 7,815,230 | B2 | * | 10/2010 | Yoshikuwa | E05B 81/25 292/201 |
| 7,823,933 | B2 | * | 11/2010 | Layos | E05B 79/20 292/37 |
| 7,905,523 | B2 | * | 3/2011 | Stefanic | E05B 79/20 292/201 |
| 8,033,584 | B2 | * | 10/2011 | Akizuki | E05B 81/20 292/216 |
| 8,127,497 | B2 | * | 3/2012 | Rogers | E05F 15/646 49/360 |
| 8,444,189 | B2 | * | 5/2013 | Jitsuishi | E05B 81/20 292/201 |
| 8,511,723 | B2 | * | 8/2013 | Otsuka | B60N 2/01583 292/216 |
| 8,528,948 | B2 | * | 9/2013 | Bettin | E05B 79/20 292/201 |
| 8,555,684 | B1 | * | 10/2013 | Chen | E05B 47/0012 70/280 |
| 8,672,386 | B2 | * | 3/2014 | Yoo | B60N 2/01583 296/65.03 |
| 8,757,680 | B2 | * | 6/2014 | Byun | E05B 81/00 292/201 |
| 8,757,681 | B2 | * | 6/2014 | Graute | E05B 81/14 292/201 |
| 8,783,738 | B2 | * | 7/2014 | Watanabe | E05B 85/26 292/201 |
| 8,857,890 | B2 | * | 10/2014 | Okada | H02K 1/30 296/146.4 |

(56) References Cited

U.S. PATENT DOCUMENTS

| | | | | |
|---|---|---|---|---|
| 8,864,187 | B2* | 10/2014 | Jitsuishi | E05F 15/40 |
| | | | | 292/201 |
| 9,068,646 | B2* | 6/2015 | Hagedorn | F16H 57/082 |
| 10,100,558 | B2* | 10/2018 | Graute | E05B 81/20 |
| 10,227,810 | B2* | 3/2019 | Linden | E05F 15/611 |
| 10,270,309 | B2* | 4/2019 | Nishio | E05B 79/02 |
| 10,316,553 | B2* | 6/2019 | Krishnan | E05C 3/124 |
| 10,458,171 | B2* | 10/2019 | Khan | E05F 15/611 |
| 10,518,618 | B2* | 12/2019 | Liu | F16H 37/041 |
| 10,576,846 | B2* | 3/2020 | Lee | B60N 2/3011 |
| 2002/0000726 | A1* | 1/2002 | Zintler | E05B 81/08 |
| | | | | 292/216 |
| 2002/0093207 | A1* | 7/2002 | Ehret | E05B 81/20 |
| | | | | 292/216 |
| 2004/0189016 | A1* | 9/2004 | Fukunaga | E05B 81/06 |
| | | | | 292/201 |
| 2004/0232706 | A1* | 11/2004 | Kurten | E05B 81/14 |
| | | | | 292/216 |
| 2004/0245786 | A1* | 12/2004 | Hashiba | E05B 81/66 |
| | | | | 292/216 |
| 2004/0262945 | A1* | 12/2004 | Suzuki | E05B 65/0811 |
| | | | | 296/155 |
| 2005/0039404 | A1* | 2/2005 | Mrkovic | E05F 15/622 |
| | | | | 49/360 |
| 2005/0134054 | A1* | 6/2005 | Stefanic | E05B 17/0004 |
| | | | | 292/201 |
| 2005/0184533 | A1* | 8/2005 | Hebenstreit | F16D 63/006 |
| | | | | 292/201 |
| 2005/0205361 | A1* | 9/2005 | Fisher | E05B 81/25 |
| | | | | 185/37 |
| 2005/0236847 | A1* | 10/2005 | Taniyama | E05B 81/14 |
| | | | | 292/216 |
| 2005/0284201 | A1* | 12/2005 | Kachouh | B60N 2/0232 |
| | | | | 70/416 |
| 2006/0220416 | A1* | 10/2006 | Mrkovic | E05F 15/646 |
| | | | | 296/155 |
| 2007/0125605 | A1* | 6/2007 | Choi | B60T 7/085 |
| | | | | 188/2 D |
| 2007/0138802 | A1* | 6/2007 | Stasko | E05B 79/20 |
| | | | | 292/201 |
| 2007/0138805 | A1* | 6/2007 | Moore | E05B 81/25 |
| | | | | 292/216 |
| 2007/0200359 | A1* | 8/2007 | Lewis | B60R 21/38 |
| | | | | 292/216 |
| 2009/0236863 | A1* | 9/2009 | Akizuki | E05B 81/14 |
| | | | | 292/201 |
| 2011/0012379 | A1* | 1/2011 | Shimura | E05B 83/40 |
| | | | | 292/336.3 |
| 2011/0012380 | A1* | 1/2011 | Bendel | E05B 81/20 |
| | | | | 292/341.16 |
| 2011/0126657 | A1* | 6/2011 | Ganter | F16H 61/12 |
| | | | | 74/473.12 |
| 2011/0316293 | A1 | 12/2011 | Luschper et al. | |
| 2014/0145057 | A1* | 5/2014 | Sayama | B60N 2/01583 |
| | | | | 248/503.1 |
| 2014/0175812 | A1* | 6/2014 | Wirths | E05B 77/38 |
| | | | | 292/194 |
| 2015/0069766 | A1* | 3/2015 | Estrada | E05B 77/12 |
| | | | | 292/194 |
| 2016/0032626 | A1* | 2/2016 | Margheritti | E05C 3/124 |
| | | | | 292/220 |
| 2016/0177602 | A1* | 6/2016 | Graute | E05B 81/32 |
| | | | | 74/424.71 |
| 2016/0281400 | A1* | 9/2016 | Byun | E05B 81/38 |
| 2017/0138094 | A1* | 5/2017 | Taurasi | E05B 81/06 |
| 2017/0191289 | A1* | 7/2017 | Perkins | E05B 81/06 |
| 2017/0268277 | A1* | 9/2017 | Thiele | E05F 15/657 |
| 2018/0038137 | A1* | 2/2018 | Damboiu | E05B 77/26 |
| 2018/0187461 | A1* | 7/2018 | Mueller | B60R 25/24 |
| 2018/0187463 | A1* | 7/2018 | Schmidt | E05C 3/12 |
| 2018/0230716 | A1* | 8/2018 | Schiffer | E05B 77/10 |
| 2018/0230718 | A1* | 8/2018 | Menke | E05B 15/022 |
| 2018/0258671 | A1* | 9/2018 | Graute | E05B 81/50 |

FOREIGN PATENT DOCUMENTS

| | | | |
|---|---|---|---|
| DE | 198 04 516 A1 | 8/1999 | |
| DE | 102 42 830 A1 | 12/2003 | |
| DE | 202012004789 U1 * | 8/2013 | ............ E05B 81/20 |
| DE | 202014106158 U1 * | 3/2016 | ............ E05B 79/20 |
| DE | 102014016787 A1 * | 5/2016 | ........ E05B 63/0065 |
| DE | 202015106323 U1 * | 2/2017 | ............ E05B 81/20 |
| EP | 2431558 A2 | 3/2012 | |
| WO | 2008039922 A2 | 4/2008 | |

* cited by examiner

DUAL MOTOR DEVICE WITH APPLICATION TO POWER CINCH AND LATCH MECHANISM

CROSS-REFERENCE TO RELATED APPLICATIONS

This application is a continuation application of PCT International Application No. PCT/CA2014/000572 filed Jul. 27, 2014 which claims the benefit of U.S. Provisional Application No. 61/847,249, filed Jul. 17, 2013, and U.S. Provisional Application No. 61/949,647, filed Mar. 7, 2014, the contents of which are incorporated herein in their entirety.

FIELD OF THE INVENTION

This present invention relates to a latch assembly for securing and unsecuring vehicle components such as seats and closure panels.

BACKGROUND

A typical motor vehicle door is mounted in a door frame on the vehicle and is movable between open and closed positions. Usually the door is held in a closed position by the latching engagement between a spring-biased ratchet pivotally mounted inside the door latch and a U-shaped striker secured to the door frame. The ratchet is most often spring-biased toward the unlatched position to release the striker and is maintained in the latched position to hold the striker by a spring-biased pawl or other mechanical structure. The ratchet cannot pivot to release the striker until the pawl is moved.

The majority of these door latches are exclusively manually operated both to unlatch the door and to relatch the door. Typically, the manual release handles are provided on the inside and outside of the door to release the ratchet from the striker by moving the pawl so that the door can be opened. The door is closed and relatched by manually pivoting the door so that the ratchet impacts the striker with sufficient force to pivot the ratchet to the latched position against the spring force exerted by the ratchet spring.

It is often difficult, however, to completely close and latch manually latching vehicle doors on current model vehicles because the desire to reduce vehicle weight and to improve fuel economy has led engineers to design vehicles with relatively thin and lightweight doors. Often relatively hard door seals are used with these thin, lightweight doors to improve sealing around the door, particularly at high driving speeds. Because many vehicle doors are relatively lightweight and have relatively hard door seals, many vehicles doors often have insufficient internal energy when pushed closed to compress these hard door seals and fully pivot the ratchet to the latched position to latch the door.

Power assisted door latch assemblies have been developed to overcome the problems associated with latching doors with lightweight construction and hard door seals. Power assisted door latch assemblies allow low internal energy or soft closure of the lightweight doors without the need to slam the door even with the increased seal pressure that results from relatively hard door seals.

It is also recognized that power assisted seat latch assemblies are needed to overcome problems associated with latching seats. For example, power assisted seat latch assemblies can allow for release of the seats from a secure locking position.

Current problems exist with powered latch assemblies, including complicated latch component configurations and large and inconvenient assembly footprints. Further, single motor configurations used as actuators for the powered latch assemblies are inconvenient due to their larger footprint and cost/maintenance issues. These include applications for both seat and closure panel assemblies.

SUMMARY

It is an object to the present invention to provide a powered latch assembly to obviate or mitigate at least one of the above-mentioned problems.

A first aspect provided is a power cinch linkage system having a rotary drive actuation system for actuating the power cinch linkage system of a latch, the rotary drive actuation system including: an output shaft for driving the power cinch linkage system via a cinch member affixed at one end of the output shaft; a common drive element affixed to the output shaft at the other end of the output shaft; and a plurality of motors coupled to the common drive element for simultaneously driving the common drive element and the output shaft in a first rotary direction to effect actuation of the power cinch linkage system.

An aspect provided is a power latch release system having a rotary drive actuation system for actuating the release of a latch, the rotary drive actuation system including: an output shaft for driving the release system via a release member affixed at one end of the output shaft; a common drive element affixed to the output shaft at the other end of the output shaft; and a plurality of motors coupled to the common drive element for simultaneously driving the common drive element and the output shaft in a first rotary direction to effect actuation of the release system.

A second aspect provided is a cinch linkage system of a latch having a rotary drive actuation system for actuation, the rotary drive actuation system including: an output shaft for driving the power cinch linkage system via a cinch member affixed at one end of the output shaft; a common drive element affixed to the output shaft at the other end of the output shaft; and a plurality of motors coupled to the common drive element for simultaneously driving the common drive element and the output shaft in a first rotary direction to effect actuation of the power cinch linkage system.

A third aspect provided is a latch having a rotary drive actuation system for use in actuating a power cinch linkage system of the latch, the rotary drive actuation system including: an output shaft for driving the power cinch linkage system via a cinch member affixed at one end of the output shaft; a common drive element affixed to the output shaft at the other end of the output shaft; and a plurality of motors coupled to the common drive element for simultaneously driving the common drive element and the output shaft in a first rotary direction to effect actuation of the power cinch linkage system.

A fourth aspect provided is an actuated cinch mechanism for a latch for a closure panel of a vehicle, the cinch mechanism comprising: a frame configured for mounting to either a body or the closure panel of the vehicle, the frame having a first frame portion with a first mounting surface and a second frame portion with a second mounting surface, the second frame portion extending from the first frame portion; a motorized actuation system mounted on the first mounting surface, the motorized actuation system having at least one motor with an output shaft having a longitudinal axis; a cinch cam coupled to the output shaft and configured to rotate about the longitudinal axis in a first direction and in a second direction opposite the first direction; a latch mounted on the second mounting surface, the latch having a plurality of latch components including a cinch lever for operating the latch from a partially closed latch position to a fully closed and cinched position; and a cable extending between the cinch cam and the cinch lever, the cable coupling rotational movement of the cinch cam to movement of the cinch lever.

The rotary drive actuation system can have a back drive biasing element coupled to the output shaft, such that back drive biasing element biases the output shaft in second rotary direction opposite the first rotary direction. The back drive biasing element is coupled to the output shaft by a gear and the back drive biasing element is a spring.

The rotary drive actuation system, wherein the common drive element is a common drive gear affixed to the output shaft and each of the plurality of motors is coupled independently to the common drive gear by a respective gear attached to a respective drive shaft of the motor. Each of the plurality of motors are mounted side by side in a common housing.

The rotary drive actuation system, wherein the cinch member is affixed to the output shaft for corotation of the cinch member and the output shaft when driven by the plurality of motors. The cinch member has a plurality of arms.

The rotary drive actuation system further comprises a cinch cam coupled to the one end of the output shaft, such that rotation of the cinch member causes rotation of the cinch cam about the output shaft due to contact with at least one of a plurality of arms. The cinch cam is configured to rotate about the output shaft independently of the rotation of the cinch member and the output shaft. The cinch cam has a mounting portion for coupling a cable thereto, the cable part of the power cinch linkage system coupled to a latch component of the latch.

The actuated cinch mechanism, wherein the second frame portion extends from the first frame portion at an acute angle as measured between the mounting surfaces, such that the frame is an angled frame. The actuated cinch mechanism further comprises a pulley mounted to the frame, the pulley guiding the cable in an indirect path between the cinch cam and the cinch lever. The second frame portion extends from the first frame portion at an acute angle as measured between the mounting surfaces, such that the frame is an angled frame and the pulley is mounted on the first frame portion. A first cable portion of the cable is between the cinch cam and the pulley and a second cable portion of the cable is between the pulley and the cinch lever, such that the first cable portion of the cable and the second cable portion of the cable are non-parallel with respect to one another. A first cable portion of the cable is between the cinch cam and the pulley and a second cable portion of the cable is between the pulley and the cinch lever, such that the first cable portion of the cable and the second cable portion of the cable are non-coplanar.

The actuated cinch mechanism, wherein the cinch cam is mounted on the output shaft to provide for relative rotational movement between the output shaft and the cinch cam. The cinch lever is connected to the cable by an intermediary cinch arm. The intermediary cinch arm is in-line between an end of the cable adjacent to the latch and the cinch lever, such that the cinch arm is pivotally connected to the cinch lever.

The actuated cinch mechanism further comprises the first frame portion defining the first mounting surface as an actuator plane and the second frame portion defining the second mounting surface as a latch plane, such that the motorized actuation system, cinch cam, and pulley associated with the actuator plane are compatible with different versions of the angled frame having a different said angle. Each of the different versions of the angled frame has a corresponding respective latch configuration such that each of the respective latch configurations includes at least one of the plurality of latch components having an angled body compatible with the respective different said angle. At least one of the plurality of latch components is a pawl having an angled body with a first pawl portion and a second pawl portion, such that the first pawl portion lies in the actuator plane and the second pawl portion lies in the actuator plane. The first frame portion is integral with the second frame portion.

The actuated cinch mechanism further comprises a cinch member coupled to the output shaft and configured for rotation about the longitudinal axis, the cinch member having a first lever arm for contacting and manipulating movement of at least one of the plurality of latch components and a second lever arm for contacting the cinch cam, wherein movement of the cinch member about the longitudinal axis can be performed independently of movement of the cinch cam about the longitudinal axis. The actuated cinch mechanism further comprises a slot in the cinch cam, the second lever arm configured for translational movement within the slot, such that movement of the cinch member about the longitudinal axis can be performed independently of movement of the cinch cam about the longitudinal axis. The actuated cinch mechanism further comprising a cinch member coupled to the output shaft and configured for rotation about the longitudinal axis, the cinch member having a first lever arm for contacting and manipulating movement of at least one of the plurality of latch components and a second lever arm for contacting and manipulating movement of the cinch cam about the longitudinal axis. The cinch member is affixed to the output shaft such that the output shaft and the cinch member simultaneously rotate together about the longitudinal axis in both the first direction and the second direction. The cinch cam is mounted on the output shaft to provide for relative rotational movement between the output shaft and the cinch cam. The cinch lever is mounted on a shaft facilitating pivotal movement of the cinch lever between a first position representing the partially closed latch position and a second position representing the fully closed and cinched position, such that the shaft is connected to the second frame portion and shared by at least another component of the plurality of latch components.

Other elements of the cinch mechanism can include: the at least another component is a pawl mounted on the shaft; a biasing element coupled to the output shaft, the biasing element for providing a bias to the cinch lever towards a position associated with the partially closed latch position; material of the first frame portion is integral with material of the second frame portion; and/or the first frame portion is connected to the second frame portion via mechanical fastening.

A fifth aspect provided is a rotary drive actuation system for actuating a latch including: an output shaft having a member affixed at one end of the output shaft for coupling to a component of the latch; a common drive element affixed to the output shaft at the other end of the output shaft; and a plurality of motors coupled to the common drive element for simultaneously driving the common drive element and the output shaft in a first rotary direction to effect actuation of the latch.

A sixth aspect provided is a power latch system including: a frame; a latch mounted on the frame and including a plurality of latch components; a rotary drive actuation system mounted on the frame, the rotary drive actuation system for actuating at least one of the plurality of latch components and including: an output shaft having a member affixed at one end of the output shaft for coupling to a component of the plurality of latch components; a common drive element affixed to the output shaft at the other end of the output shaft; and a plurality of motors coupled to the common drive element for simultaneously driving the common drive element and the output shaft in a first rotary direction to effect actuation of the component of the latch.

BRIEF DESCRIPTION OF THE DRAWINGS

The foregoing and other aspects will be more readily appreciated having reference to the drawings, wherein:

FIG. 2 shows an example powered cinch latch mechanism in an unlatched configuration for the vehicle of FIG. 1a;

FIG. 2a shows a further embodiment of the latch system of FIG. 1a;

DESCRIPTION

Figure 1A:
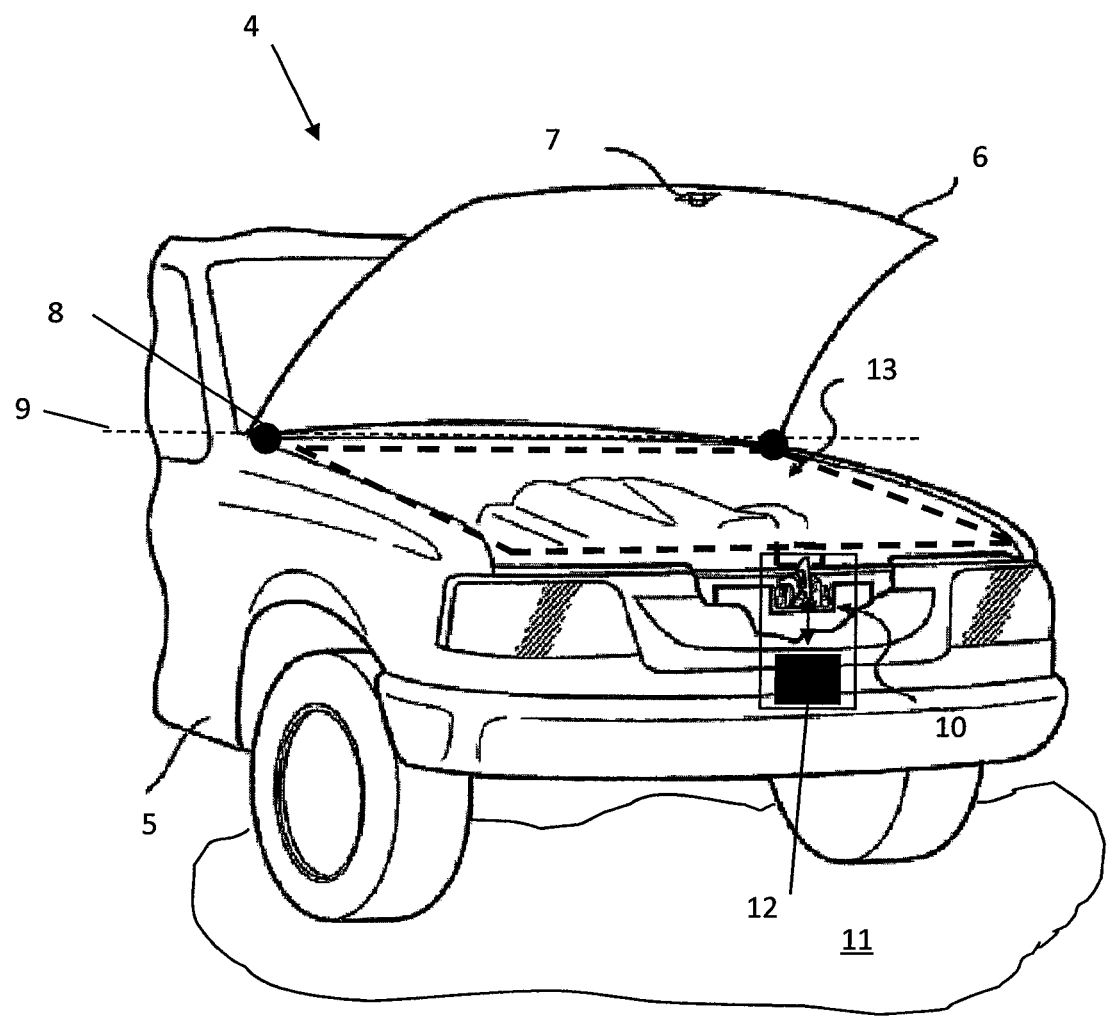
FIG. 1a is a perspective view of an example vehicle.

Referring to FIG. 1a, shown is a vehicle 4 with a vehicle body 5 having one or more closure panels 6 coupled to the vehicle body 5. The closure panel 6 is connected to the vehicle body 5 via one or more hinges 8 and a latch 10 (e.g. for retaining the closure panel 6 in a closed position once closed). It is also recognized that the hinge 8 can be configured as a biased hinge 8 to bias the closure panel 6 towards an open position and/or towards the closed position. As such, the hinge 8 can also incorporate one or more actuated struts to assist in opening and closing of the closure panel 6, as desired. The closure panel 6 has a mating latch component 7 (e.g. striker) mounted thereon for coupling with the latch 10 mounted on the vehicle body 5. Alternatively, latch 10 can be mounted on the closure panel 6 and the mating latch component 7 mounted on the body 5 (not shown).

Figure 1B:
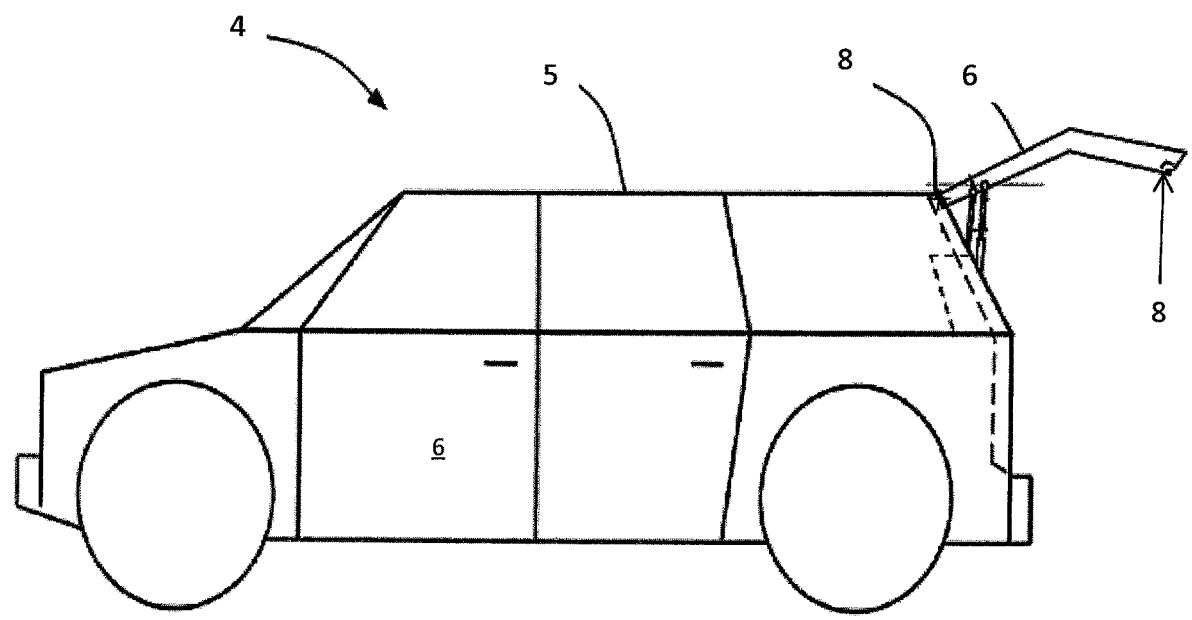
FIG. 1b is a perspective view of a further example of a vehicle.

Referring to FIG. 1b, shown is the vehicle 4 with the vehicle body 5 having an alternative embodiment of the one or more closure panels 6 coupled to the vehicle body 5. The closure panel 6 is connected to the vehicle body 5 via one or more hinges 8 and latch 10 (e.g. for retaining the closure panel 6 in a closed position once closed). It is recognized that examples of the closure panel can include a hood panel, a door panel, a hatch panel and other panels as desired.

The hinges 8 provide for movement of the closure panel 6 between a closed panel position (shown in dashed outline) and an open panel position (shown in solid outline), such that the hinges 8 can be involved during the movement of the closure panel 6 between the open panel position and the closed panel position, can be involved in driving the movement of the closure panel 6 towards the open panel position (e.g. as a biased hinge 8 or strut not shown), or can be involved in driving the movement of the closure panel 6 towards the closed panel position. In the embodiment shown, the closure panel 6 pivots between the open panel position and the closed panel position about a pivot axis 9 (e.g. of the hinge 8), which can be configured as horizontal or otherwise parallel to a support surface 11 of the vehicle 4. In other embodiments, the pivot axis 9 may have some other orientation such as vertical or otherwise extending at an angle outwards from the support surface 11 of the vehicle 4. In still other embodiments, the closure panel 6 may move in a manner other than pivoting, for example, the closure panel 6 may translate along a predefined track or may undergo a combination of translation and rotation between the open and closed panel positions, such that the hinge 8 includes both pivot and translational components (not shown). As can be appreciated, the closure panel 6 can be embodied, for example, as a hood, passenger door, or lift gate (otherwise referred to as a hatch) of the vehicle 4.

Also provided is a power latch system 12 (also referred to as latch system 12) coupled to the latch 10, as further described below. The power latch system 12 is configured for actuating the operation of the latch 10. In this manner, the power latch system 12 can be used to forcefully provide, during deployment, some form of force assisted open operation (e.g. full open, partial open, etc.) of the closure panel 6 and/or some form of force assisted close operation (e.g. full open, partial open, etc.) of the closure panel 6.

For vehicles 4, the closure panel 6 can be referred to as a partition or door, typically hinged, but sometimes attached by other mechanisms such as tracks, in front of an opening 13 which can be used for entering and exiting the vehicle 4 interior by people and/or cargo. It is also recognized that the closure panel 6 can be used as an access panel for vehicle 4 systems such as engine compartments and also for traditional trunk compartments of automotive type vehicles 4. The closure panel 6 can be opened to provide access to opening, or closed to secure or otherwise restrict access to the opening 13. It is also recognized that there can be one or more intermediate open positions (e.g. unlatched position) of the closure panel 6 between a fully open panel position (e.g. unlatched position) and fully closed panel position (e.g. latched position), as provided at least in part by the hinges 8 and latch 10, as assisted by the power latch system 12. For example, the power latch system 12 can be used to provide an opening force (or torque) and/or a closing force (or torque) for the closure panel 6.

Movement of the closure panel 6 (e.g. between the open and closed panel positions) can be electronically and/or manually operated, where power assisted closure panels 6 can be found on minivans, high-end cars, or sport utility vehicles (SUVs) and the like. As such, it is recognized that movement of the closure panel 6 can be manual or power assisted during operation of the closure panel 6 at, for example: between fully closed (e.g. locked or latched) and fully open (e.g. unlocked or unlatched); between locked/latched and partially open (e.g. unlocked or unlatched); and/or between partially open (e.g. unlocked or unlatched) and fully open (e.g. unlocked or unlatched). It is recognized that the partially open configuration of the closure panel 6 can also include a secondary lock (e.g. closure panel 6 has a primary lock configuration at fully closed and a secondary lock configuration at partially open—for example for latches 10 associated with vehicle hoods).

In terms of vehicles 4, the closure panel 6 may be a hood, a lift gate, or it may be some other kind of closure panel 6, such as an upward-swinging vehicle door (i.e. what is sometimes referred to as a gull-wing door) or a conventional type of door that is hinged at a front-facing or back-facing edge of the door, and so allows the door to swing (or slide) away from (or towards) the opening 13 in the body 5 of the vehicle 4. Also contemplated are sliding door embodiments of the closure panel 6 and canopy door embodiments of the closure panel 6, such that sliding doors can be a type of door that open by sliding horizontally or vertically, whereby the door is either mounted on, or suspended from a track that provides for a larger opening 13 for equipment to be loaded and unloaded through the opening 13 without obstructing access. Canopy doors are a type of door that sits on top of the vehicle 4 and lifts up in some way, to provide access for vehicle passengers via the opening 13 (e.g. car canopy, aircraft canopy, etc.). Canopy doors can be connected (e.g. hinged at a defined pivot axis and/or connected for travel along a track) to the body 5 of the vehicle at the front, side or back of the door, as the application permits. It is recognized that the body 5 can be represented as a body panel of the vehicle 4, a frame of the vehicle 4, and/or a combination frame and body panel assembly, as desired.

Figure 2:
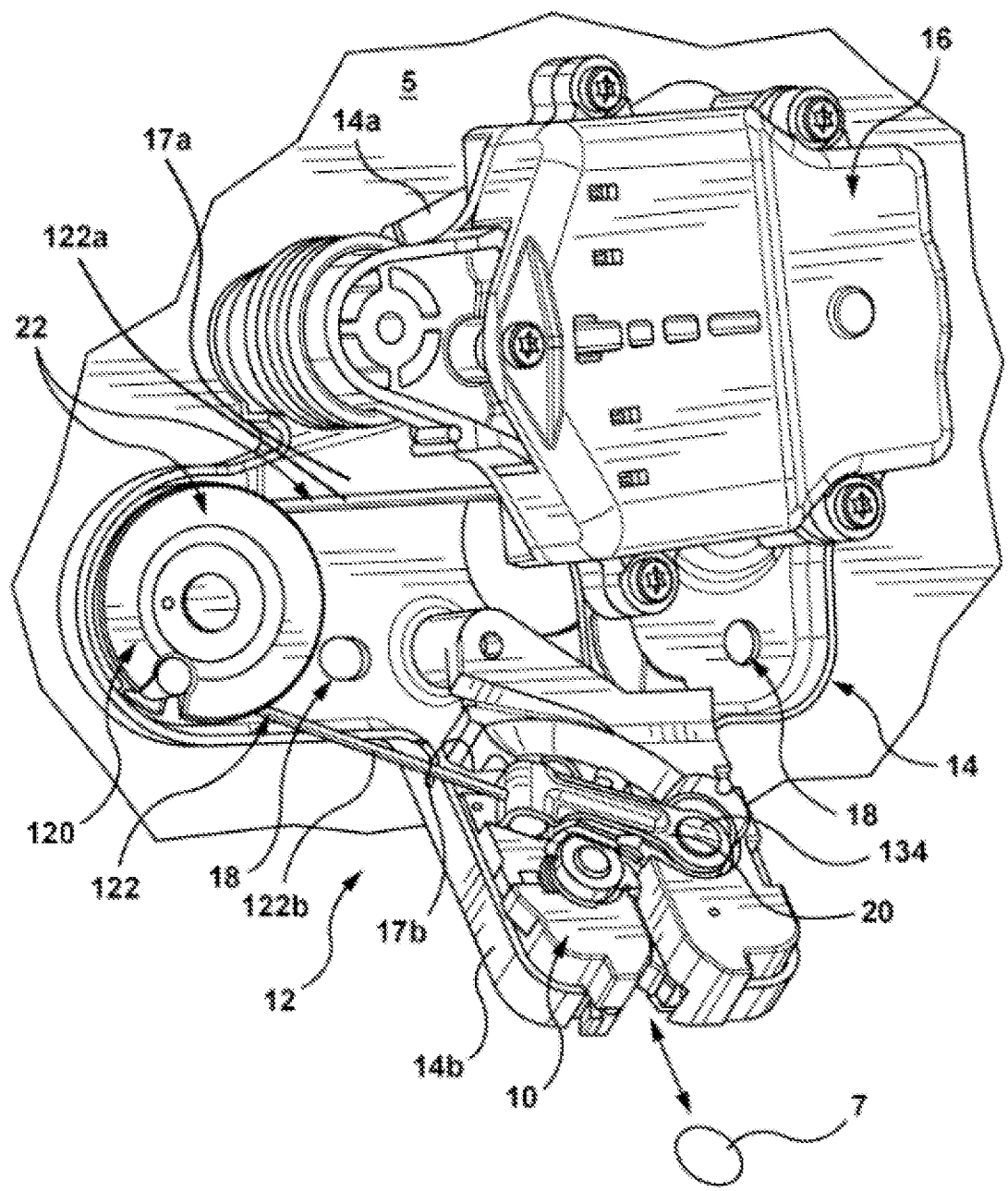
Figure 2A:
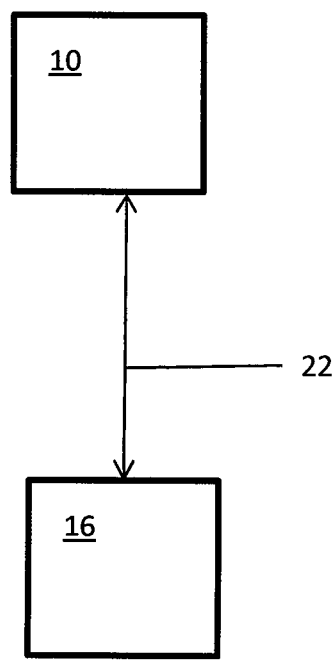

Referring to FIG. 2, shown is a power latch assembly 12 having a frame 14, a rotary actuator system 16 mounted on the frame 14 and the latch 10 mounted on the frame 14. The power latch assembly 12 can be coupled to the body 5 via frame mounting portions 18 (e.g. mounting holes, mounting pins, etc.) The latch 10 is oriented on the frame 14 so as to be aligned to engage the mating latch component 7 (e.g. striker 7). The rotary actuator system 16 is coupled to a member 20 (e.g. cinch arm) 20 via a cinch linkage 22 (e.g. pulley and cable system as further described below) and also to one or more latch components 23 (e.g. ratchet 24 and/or pawl 25 as further described below—see FIG. 3). As such, the member 20 can be actuated (e.g. pulled) by the cinch linkage 22 to operate the closure panel 6 from a partially closed position to a fully closed position, as further described below, as the member 20 can be coupled to the ratchet 24 via a cinch lever arm 21 (see FIG. 5). It is also recognized that the cinch linkage 22, see FIG. 2a, can be provided as a rigid linkage rather than as a flexible linkage involving cables. For example, the cinch linkage 22 can be embodied as a sector gear (or other series of rigid members) connected to the member 20 and/or the cinch lever 21 at one end of the cinch linkage 22. At the other end of the cinch linkage 22, a gear (e.g. an alternative version of the cinch member 101) is connected to the output shaft 74 that thus drives the sector gear to move the member 20 in order to cinch the latch 10 as described.

Figure 3:
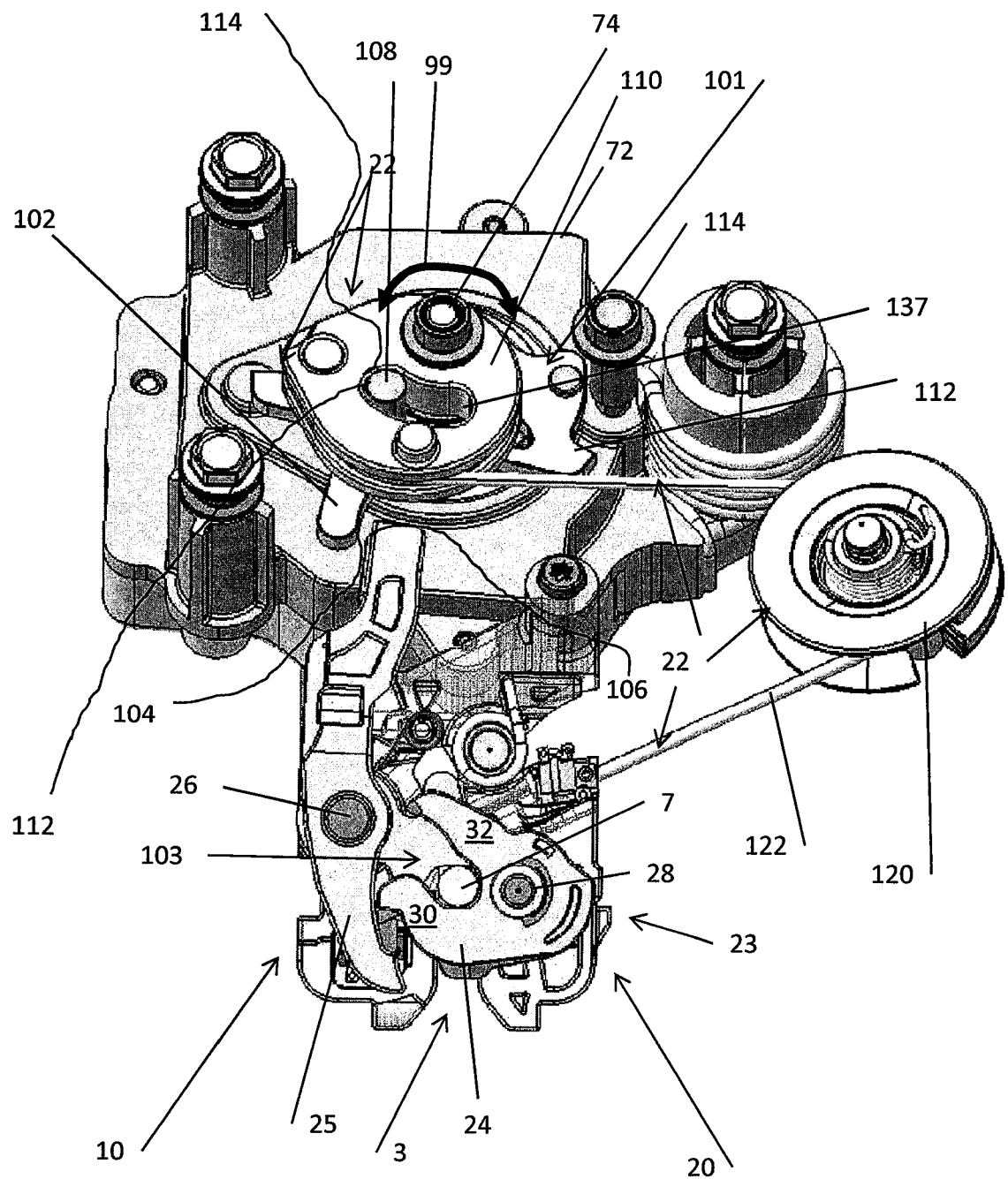
FIG. 3 shows details of the latch and cinch linkage assembly of the mechanism of FIG. 2.
Figure 4:
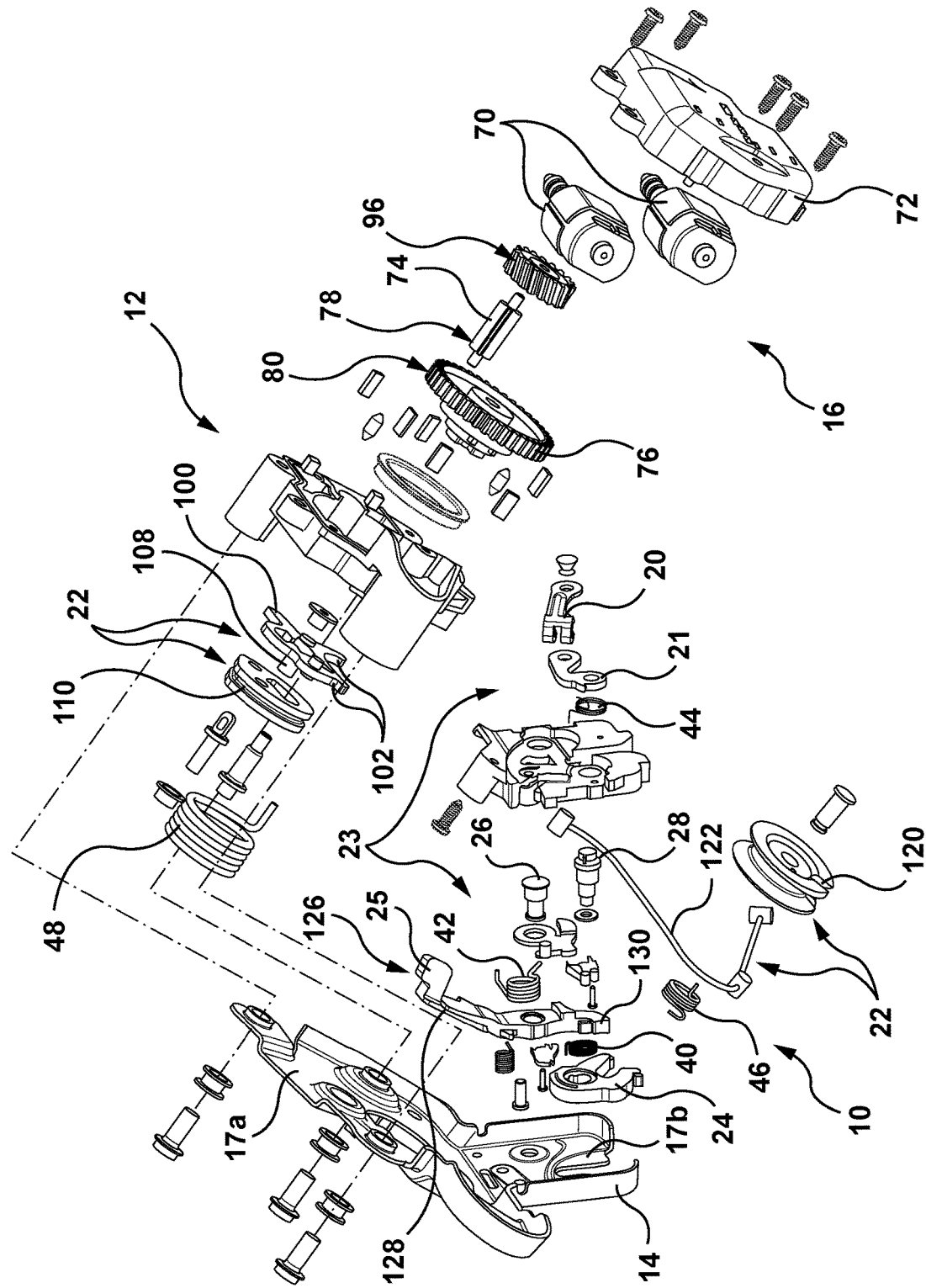
FIG. 4 is an exploded view of the powered cinch latch mechanism of FIG. 2.
Figure 5:
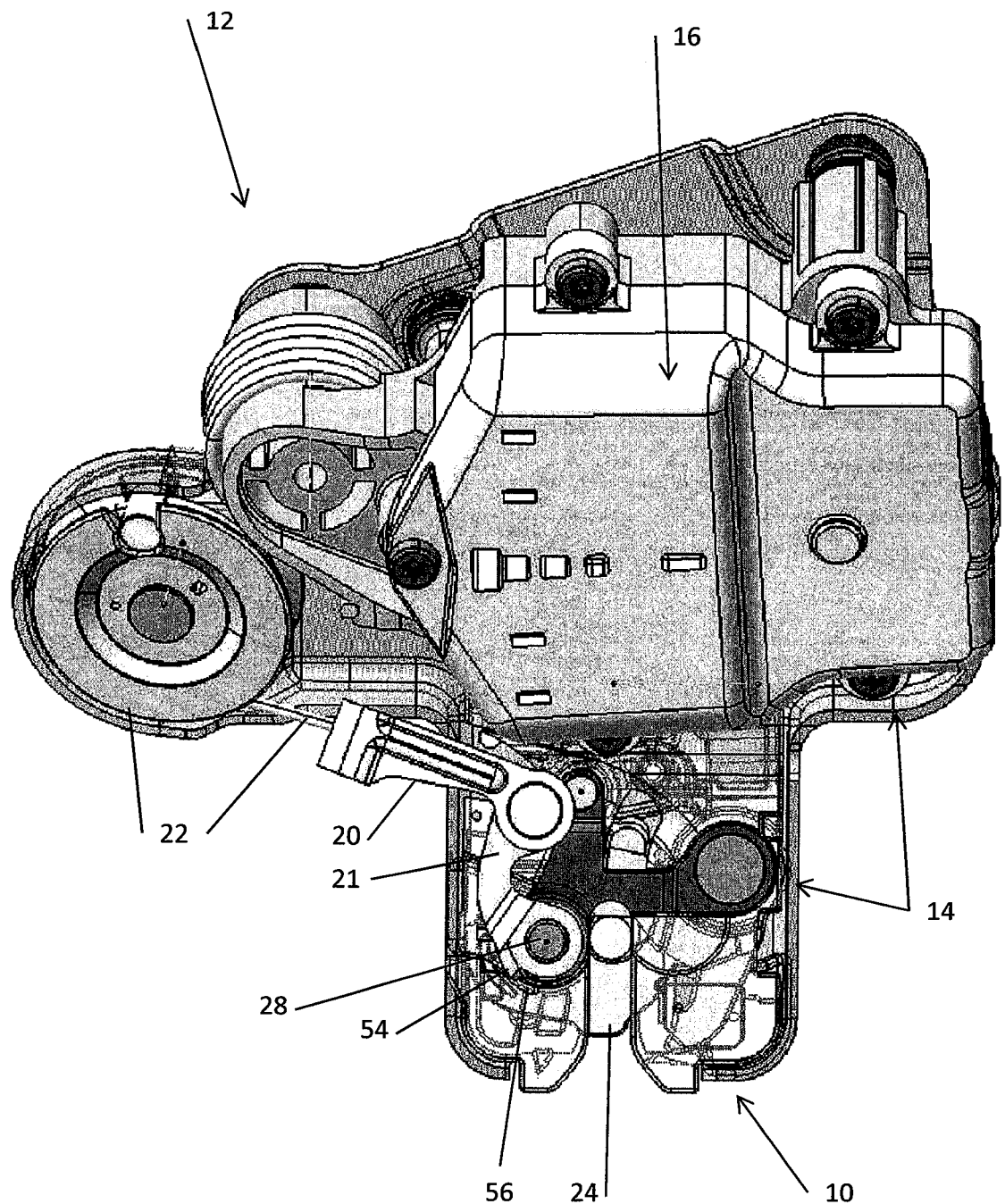
FIG. 5 shows the powered cinch latch mechanism of FIG. 2 in a primary latch position.

Referring to FIGS. 3, 4, 5, the latch 10 includes a number of latch elements 23 (e.g. ratchet 24, cinch linkage 22, cinch lever 21 and pawl 25) that are configured to cooperate with the mating latch component 7 in order to retain the mating latch component 7 within a slot 3 when the closure panel 6 (see FIG. 1a,b) is in the closed position (e.g. locked), or otherwise to drive the mating latch component 7 out of the slot 3 when the closure panel 6 is in the open position. The fish mouth or slot 3 is sized for receiving the mating latch component 7 therein, in other words the slot 3 of the latch 10 is configured for receiving a keeper (e.g. striker) of the mating latch component 7. The slot 3 has an open top end and a closed bottom end as shown. The latch elements 23 of the ratchet 24 and pawl 25 are pivotally secured to the frame plate 14 via respective shafts 28,26. The ratchet 24 includes an arm 30 and an arm 32 spaced apart to define a generally u-shaped slot 103 there between (e.g. a hook of arm 30 and a lip of arm 32 that extends laterally beyond the hook). Note that in FIG. 3 the latch 10 with associated ratchet 24 are shown in the fully or primary closed position (e.g. facilitating the retention of the mating latch component 7 within the slots 3, 103). It is recognized that the latch 10 can also be of a non-cinch version (e.g. as applied to a vehicle seat 100 see FIG. 13), meaning that the cinch lever 21 may be absent and instead the member 20 (e.g. release member in the case of the seat 100) is coupled to the pawl 25, as desired. In the non-cinch latch version, the latch 10 does not have the ability to cinch the striker into the slot 3 of the ratchet 24 during closure of the latch 10, rather the latch 10 operates (under influence of the actuation mechanism 16) the ratchet 24 and pawl 25 to effect release or detainment of the matching latch component 7 in the slot 3.

Referring to FIG. 4, the latch components 23 can include a number of biasing elements (for example springs), such as ratchet biasing element 40 that biases rotation of the ratchet 24 about the shaft 28 to drive the mating latch component 7 out of the slot 3 (thus moving the closure panel 6 towards the open position), pawl biasing element 42 that biases rotation of the pawl 25 about the shaft 26 to retain the ratchet 24 in the closed position (i.e. restrict rotation of the ratchet 24 about the shaft 28 under the influence of the ratchet biasing element 40), cinch biasing element 44 that can bias rotation of the cinch lever 21 towards an un-cinched position for the ratchet 24 about shaft 28 and linkage biasing element 46 that biases return of the cinch linkage 22 towards an un-cinched position of the ratchet 24.

Figure 6:
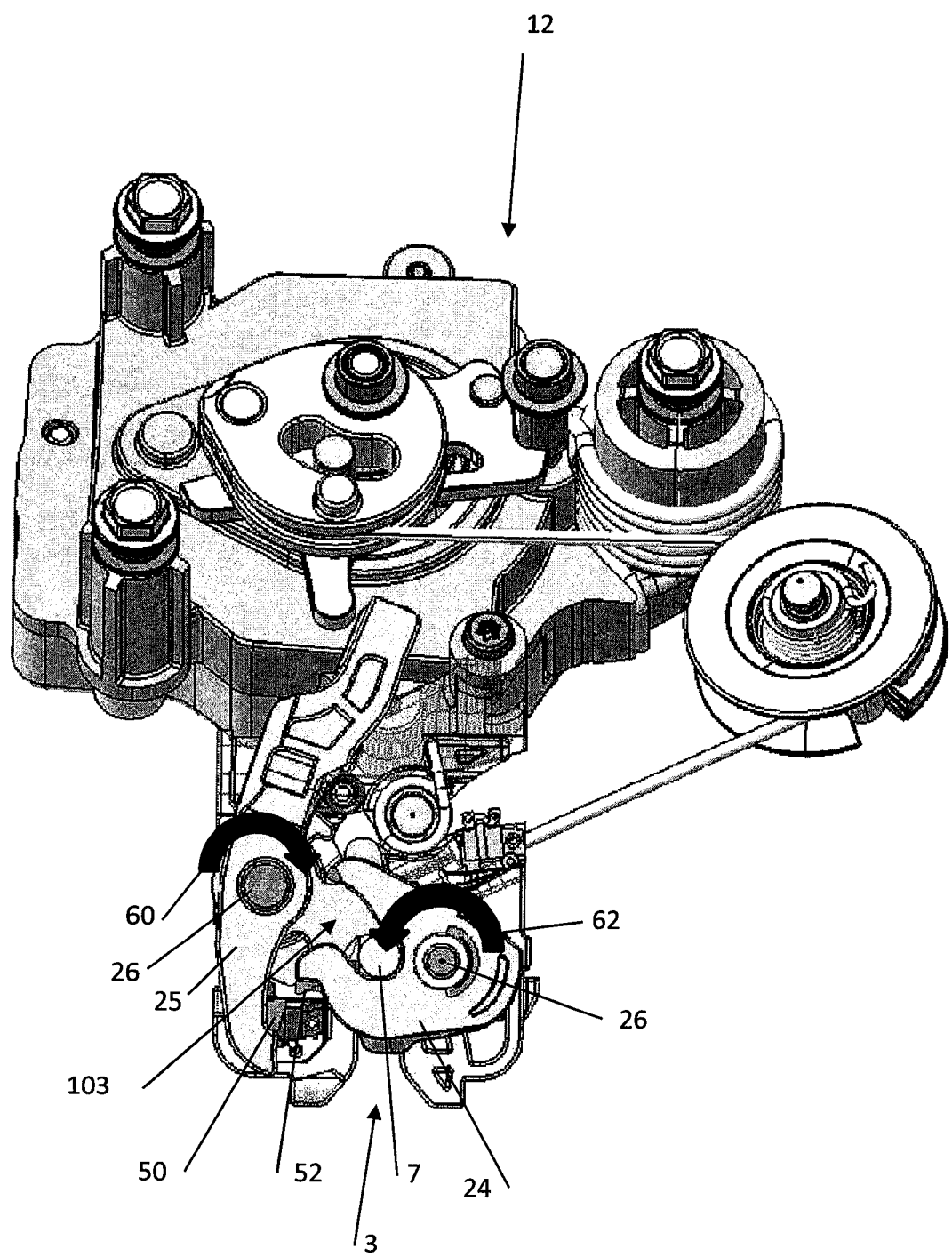
FIG. 6 shows an alternative view of the powered cinch latch mechanism of FIG. 2 in a primary latch position.

In terms of cooperation of the various latch components 23 with one another, a plurality of detents (also referred to as shoulder stops) can be employed to retain the latch components 23 in position until acted upon. For example, as can be seen in FIG. 3, the ratchet 25 has a detent 50 (or shoulder stop) that mates with detent 52 (or shoulder stop) of the ratchet 24, thus retaining the ratchet 24 in the closed position. As shown in FIG. 6, rotational movement 60 of the pawl 25 about shaft 26 removes detent 50 from contact with detent 52, against the bias of pawl biasing element 44, thus allowing for rotational movement 62 of the ratchet 24 about the shaft 28 (e.g. under the influence of the ratchet biasing element 42—see FIG. 4). Rotational movement 62 results in movement of the mating latch component 7 towards the open end of the slot 3 and therefore out of the slot 103. Referring to FIG. 5, shown is detent 54 (or shoulder stop) positioned on the cinch arm lever 21 in contact with detent 56 (or shoulder stop) positioned on the ratchet 24. As such, contact between the detents 54,56 provides for corotation of the cinch lever 21 and the ratchet 24 about the shaft 28, as further described below in relation to the cinching operation of the latch 10.

Referring again to FIG. 4, the rotary actuation system 16 includes one or more motors 70 positioned in a housing 72 and coupled to a drive shaft 74. The drive shaft 74 is coupled to a back drive biasing element 48, which can be connected to the driveshaft 74 via a back drive element 76 (e.g. gear). The back drive biasing element 48 biases the cinch lever 21 (and thereby the ratchet 24) towards the un-cinched position, while operation of the motor(s) 70 actuate(s) the position of the ratchet 24 towards the cinched position due to corotation of the cinch lever 21 and ratchet 24 about the shaft 28, as further described below. For example, a coupling element 78, such as splines, on the shaft 74 cooperate with a mating coupling element 80, such as gear teeth, on the back drive element 76, such that rotation of the back drive element 76 as driven by the bias of the back drive biasing element 76 causes rotation of the drive shaft 74 and thus return of the ratchet 24 to the un-cinched position via the cinch linkage system 22.

Figure 7:
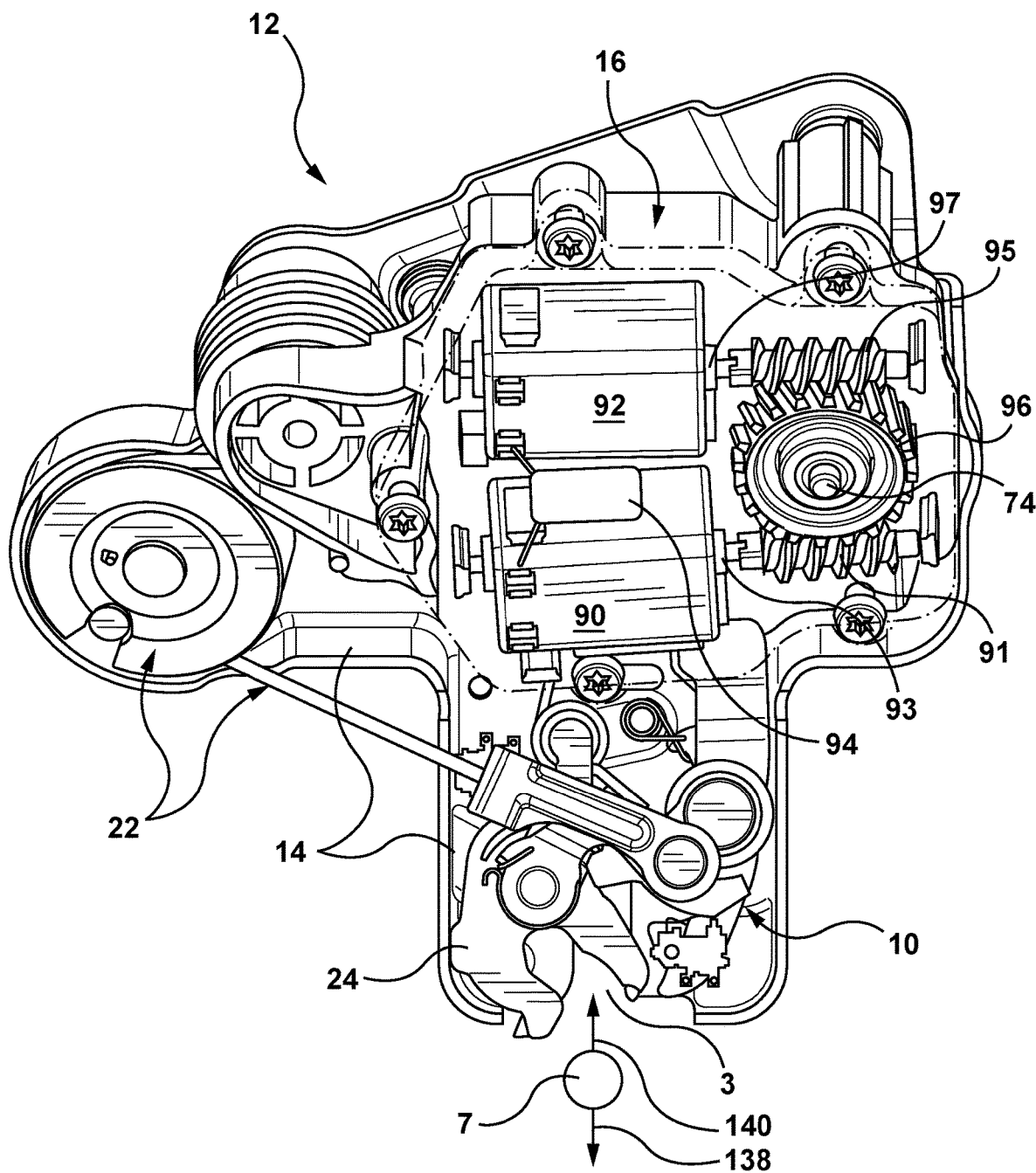
FIG. 7 shows an alternative embodiment of the cinched latch mechanism of FIG. 2 having a plurality of electronic motors.

Referring to FIG. 7, shown is an embodiment of the rotary actuation system 16 (for example for use in the power latch system 12 coupled to the linkage system 22 as a cinch linkage system 22 or as a linkage system 22 for release of the vehicle seat 100) including a plurality of motors 70 (e.g. dual motor). As shown, the rotary actuation system 16 includes two electric motors 90 and 92. A control circuit 94 controls energization of the motors 90,92. The control circuit 94 can include, for example, a simple switch, or more complex arrangement providing pinch resistance, express open/close, etc. Motor 90 has a first rotary drive element 91 (e.g. worm gear) disposed about its output shaft 93 which engages a common rotary drive element 96 (e.g. spur gear) attached to the drive shaft 74, such that the common rotary drive element 96 drives the output shaft 74 under influence of driven rotation of one or more of the motors 90,92. It is recognized that in the event of failure of one of the motors 90,92, the other operational motor 90,92 can be used to drive the drive shaft 74 while the failed motor 90,92 remains coupled to the drive shaft 74. The output shaft 74 is provided in a driving relationship to the mechanism to be driven, e.g. the linkage system 22. The linkage system 22 can include, for example, a cable and pulley mechanism as further described below. Motor 92 has a second rotary drive element 95 (e.g. worm gear) disposed about its output shaft 97 which engages the common rotary drive element 96 (e.g. spur gear) attached to the drive shaft 74. For example, as shown in FIGS. 3 and 4, the linkage system 22 can include a pulley 120 and cable 122, such that the cable 122 couples rotation of cinch cam 110 to movement of cinch lever 21. It is recognized that the linkage system 22 could optionally include the pulley 120, as desired. For example, the cable 122 could be connected directly between the cinch cam 110 and the cinch lever 21 without an intermediate pulley or, the cable 122 could be connected indirectly between the cinch cam 110 and the cinch lever 21 via an intermediate pin or series of cable guides as is known in the art (not shown).

Referring again to FIG. 7, when both the electric motors 90 and 92 are energized via control circuit 94, drive elements 91,95 both independently drive the common drive element 96 and thus the drive shaft 74, thus causing the linkage system 22 to be operated and thus manipulate the attached cinch lever 21 and attached member 20. As further discussed below, manipulation of the cinch lever 21 provides for rotation of the ratchet 24 about the shaft 28 towards and into the cinched position, thus positioning the mating latch component 7 in the fully closed position in the slot 3 of the latch 10 (see FIG. 5). Since the two motors 90 and 92 do not share the same drive elements 91,95 (i.e. each of the motors 90,92 has their own drive respective element 91, 95), the motors 90,92 can be controlled on different circuits of the control circuit 94 and can produce variable speed and torque rotary output or other power distribution arrangements. For example, the motors 90,92 can be configured so that the inherent torque ripple of the motors 90,92 is out of phase with one another. This can reduce or cancel actuator vibration and hum inherent in a single motor 90,92. Meaningful variations can be achieved by combining multiple motors 90,92 on either parallel drive trains or connecting the motors in series, along with any combination of clutch devices, as desired. In addition, multiple motors 90,92 on a common drive shaft 74 can provide a soft failure mode in the event that one motor fails. The remaining motor(s) can provide basic function at a reduced performance level until service can be performed. A further advantage of using multiple motors 90,92 coupled to a common drive shaft 74 is that a more compact design of the housing 72 (see FIG. 4) can be achieved due to the smaller footprint of the side by side motor 90,92 arrangement over that of a conventional single larger motor. Further, coupling of the motors 90,92 to a single drive shaft 74 provides for a single back drive biasing element 48 and back drive element 76 arrangement, via the common drive element 96, thus advantageously providing for efficiencies in back drive system component usages and packaging (e.g. simpler footprint). The drive shaft 74 is coupled at one end to the common drive element 96 (as driven independently by the motors 90,92) and is coupled at the other end one or more components of the cinch linkage system 22.

In view of the above, the rotary drive actuation system 16 for actuating a power linkage system 22 can have: an output shaft 74 for driving the power cinch linkage system via a cinch member affixed to one end of the drive shaft; an output drive element 96 coupled to the output shaft 74 at the other end of the output shaft 74; and a plurality of motors 90,92 coupled to the drive element for simultaneously driving the drive element 96 and the output shaft 74 in a first rotary direction 99 to effect actuation of the power cinch linkage system 22. Further, the rotary drive actuation system 16 can have the back drive biasing element 48 coupled to the output shaft 74, such that back drive biasing element 48 biases the output shaft 74 in second rotary direction 99 opposite the first rotary direction 99.

Referring again to FIGS. 3, 4 and 7, the drive shaft 74 is coupled at one end to the common drive element 96 (as driven independently by the motors 90,92) and is coupled at the other end one or more components of the linkage system 22. As noted, the linkage system 22 couples the drive shaft 74 to the ratchet 24, thus rotation (under influence of the motor(s) 90,92) of the drive shaft 74 can drive rotation of the ratchet 24 towards the cinched position shown in FIG. 3. Alternatively, rotation (under influence of the back drive biasing element 48—see FIG. 4) of the drive shaft 74 can allow for rotation of the ratchet 24 away from the cinched position under influence of the ratchet biasing element 40. For example, in FIG. 3, shown as part of the linkage system 22 is a cinch member 101 (e.g. an auxiliary lever) affixed to the drive shaft 74, such that rotation of the drive shaft 74 causes corotation 99 of the cinch member 100. The cinch member 101 has a first arm 102 having an abutment surface 104 for contact with an abutment surface 106 of the pawl 22. Rotation of the first arm 102 towards the pawl 22 causes surfaces 102,104 to contact and thus cause rotation 60 of the pawl 22 about the shaft 26 (see FIG. 6). The cinch member 101 also has a second arm 108 that is coupled to a cinch cam 110, such that rotation of the cinch member 101 causes abutment surface 112 of the second arm 108 to contact abutment surface 114 of the cinch cam 110 and thus cause rotation of the cinch cam 110 about the drive shaft 74.

Accordingly, as discussed below, the cinch cam 110 can be configured to rotate about the output shaft 74 independently of the rotation of the cinch member 101 and the output shaft 74, for example under the influence of the biasing element(s) 44, 46 (see FIG. 4). The cinch member 101 also has an abutment surface 112 configured for contact with a shoulder stop 114 mounted to the housing 72 of the rotary actuation system 16, such that contact of the abutment surface 112 with the shoulder stop 114 restricts further rotation of the output shaft 74 and cinch member 101 in the first direction 99 as driven by the motor(s) 90,92.

Referring to FIGS. 2 and 3, shown is an example actuated cinch mechanism 12 for the latch 10 for the closure panel of the vehicle 4 (see FIG. 1a,b). The cinch mechanism 12 can have the frame 14 configured for mounting to either the body 5 or the closure panel 6 of the vehicle 4, the frame 14 having a first frame portion 14a with a first mounting surface 17a and a second frame portion 14b with a second mounting surface 17b, the second frame portion 14b extending from the first frame portion 14a. The motorized actuation system 16 is mounted on the first mounting surface 17a and it is recognized that the motorized actuation system 16 can have one or more motors 90,92 coupled to an output shaft 74 having a longitudinal axis. The cinch cam 110 is coupled to the output shaft 74 and configured to rotate about the longitudinal axis in a first direction 99 and in a second direction 99 opposite the first direction 99. The latch 10 is mounted on the second mounting surface 17b, the latch has a plurality of latch components 23 including the cinch lever 21 for operating the latch 10 from a partially closed latch position (see FIG. 8) to a fully closed and cinched position (see FIG. 5). The cable 122 extends between the cinch cam 110 and the cinch lever 21, the cable 122 coupling rotational movement of the cinch cam 110 to movement of the cinch lever 21.

The cinch cam 110 can be mounted on the output shaft 74 to provide for relative rotational movement between the output shaft and the cinch cam 110, such that the cinch cam 110 can rotate independently about the longitudinal axis from rotation of the output shaft 74 about the longitudinal axis. Alternatively, the cinch cam 110 can be affixed to the output shaft 74, such that both the output shaft 74 and the cinch cam 110 rotate simultaneously in both rotational directions 99.

Referring to FIGS. 2 and 3, in terms of cable 122, cinch cam 110 and pulley 120 interaction, the actuated cinch mechanism 12 can have an optional pulley 120 mounted to the frame 14, for example on the frame portion 14a as shown in FIG. 2. As such, the pulley 120 is positioned so as to facilitate guiding of the cable 122 in an indirect path between the cinch cam 110 and the cinch lever 21. For example, one configuration is where the second frame portion 14b extends from the first frame portion 14a at an acute angle A (see FIGS. 9a,9b) as measured between the mounting surfaces 17a,17b, such that the frame 14 is an angled frame 14 and the pulley 122 is mounted on the first frame portion 14a. This configuration of the angled frame 14 provides for advantages of non-parallel and/or non-coplanar orientations of different portions 122a and 122b of the cable 122. For example, the first cable portion 122a of the cable 122 is between the cinch cam 110 and the pulley 120 and the second cable portion 122b of the cable 122 is between the pulley 120 and the cinch lever 21, such that the first cable portion 122a of the cable 122 and the second cable portion 122b of the cable 120 are non-parallel with respect to one another. It is recognized that in certain configurations of the frame portions 14a,b and orientations of the pulley 120 and latch 10, the cable portions 122a,b could be non-parallel with respect to one another while at the same time being coplanar with respect to one another. It is also recognized that the configuration of the angled frame 14 can provide for advantages of parallel and/or coplanar orientations of different portions 122a and 122b of the cable 122.

Figure 9A:
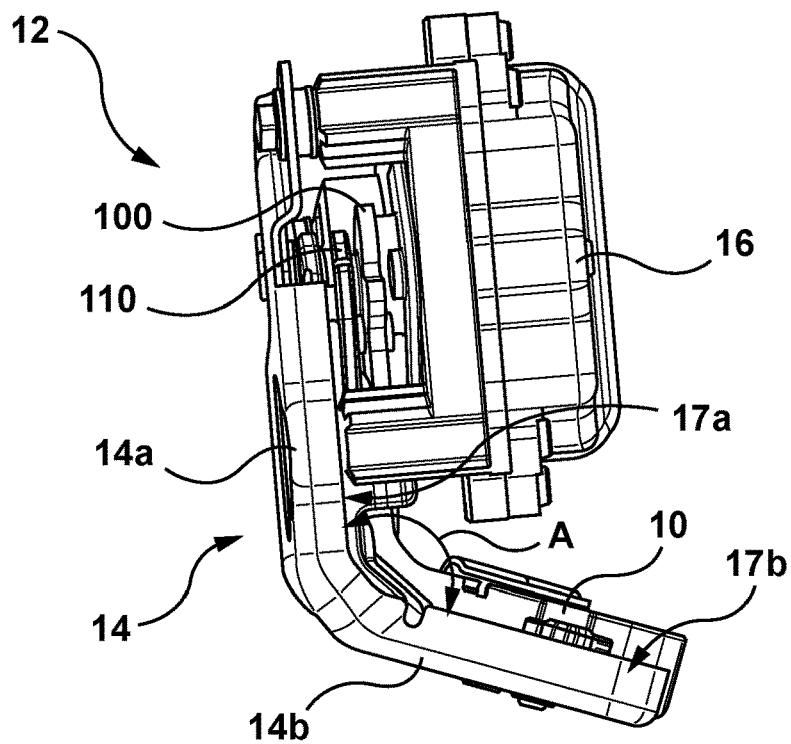
FIGS. 9a and 9b show alternative configurations of the frame of the powered cinched latch mechanism of FIG. 2.
Figure 9B:
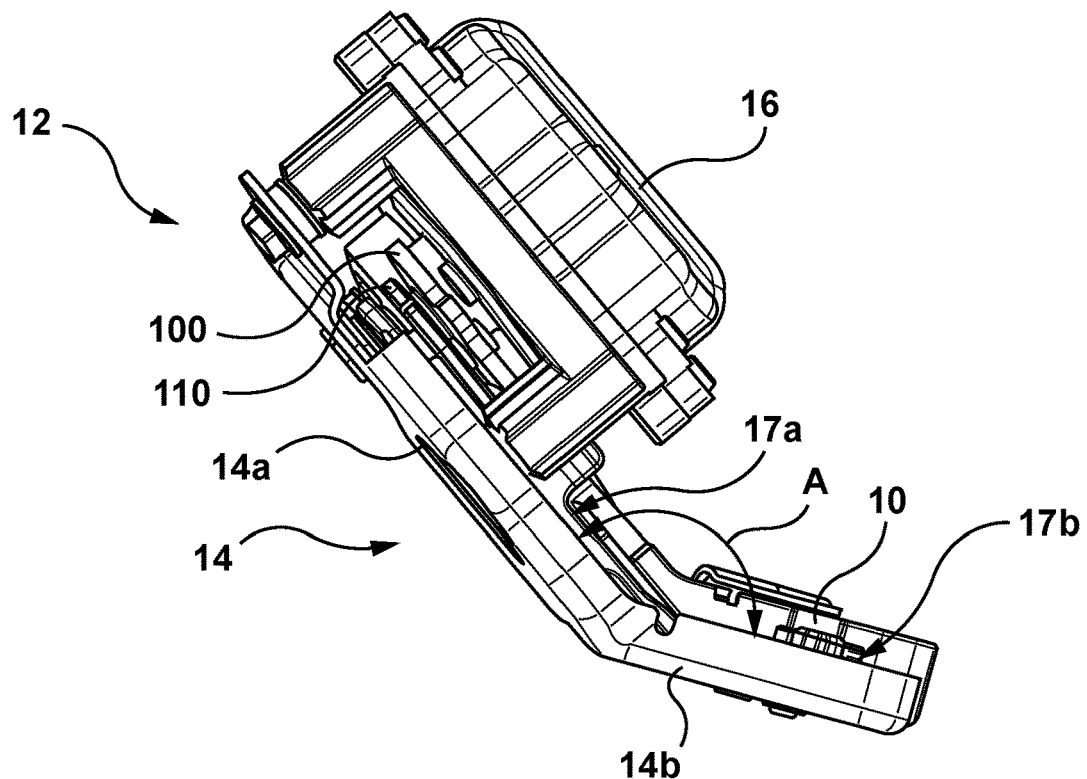

In terms of allowance for multiple latch and actuator planes, it is recognized that the first frame portion 14a can define the first mounting surface 17a as an actuator plane and the second frame portion 14b can define the second mounting surface 17b as a latch plane, such that the motorized actuation system 16, cinch cam 110, and pulley 120 associated with the actuator plane 17a are compatible with different versions of the angled frame 14 having a different angle A, as shown in FIGS. 9A,9B.

Further, in the actuated cinch mechanism 12, each of the different versions of the angled frame 14 can have a corresponding respective latch 10 configuration such that each of the respective latch 10 configurations includes at least one of the plurality of latch components 23 (see FIG. 4) having an angled body compatible with the respective different angle A for the angled frame 14 version. For example, as shown in FIG. 4, the pawl 25 can have an angled body 126 with a first pawl portion 128 and a second pawl portion 130, such that the first pawl portion 128 lies in the actuator plane 17a and the second pawl portion 130 lies in the latch plane 17b. It is recognized that the angled frame 14 can be manufactured such that the first frame portion 14a is materially integral with the second frame portion 14b (see FIG. 2).

As discussed above, an advantage of the differently angled versions of the frame portions 14a,b is that the first cable portion 122a of the cable 122 between the cinch cam 110 and the pulley 120 and the second cable portion 122b of the cable 122 between the pulley 120 and the cinch lever 21 can facilitate the first cable portion 122a and the second cable portion 122b being non-coplanar.

In terms of connection between the cable 122 and the cinch lever 21, the cinch lever 21 can be connected to the cable 122 by the intermediary member 20—see FIG. 2. For example, the intermediary member 20 is in-line between an end of the cable 122 adjacent to the latch 10 and the cinch lever 21, such that the member 20 is pivotally connected to the cinch lever 21 at pivot connection 134.

A further advantage of the example actuated cinch mechanisms 12 is provision for a common or single shaft coupled to both the cinch cable 122 (via the cinch cam 110) and to the cinch member 101 (e.g. auxiliary lever), which provides for independent operation of the latch 10 operation for manipulation of the pawl 25 and ratchet 24 from the operation of the cinch lever 21 with the ratchet 24. As such, the operation of the cinch lever 21 and the pawl 25 can be disconnected from one another. For example, as shown in FIGS. 3 and 4, the cinch member 101 is coupled to the output shaft 74 and configured for rotation about the longitudinal axis, such that the cinch member has a first lever arm 102 for contacting and manipulating movement of at least one of the plurality of latch components 23 (e.g. pawl 25) and a second lever arm 108 for contacting the cinch cam 110, wherein movement of the cinch member 100 about the longitudinal axis can be performed independently of movement of the cinch cam 110 about the longitudinal axis. One example configuration is where there is a slot 136 in the cinch cam 110, such that the second lever arm 108 is configured for translational movement within the slot 137, such that movement of the cinch member 100 about the longitudinal axis can be performed independently of movement of the cinch cam 110 about the longitudinal axis. It is realized that there can be different versions of the configuration of cinch cam 110 and cinch member 101 coupling to the output shaft 74.

For example, the cinch member 101 can be affixed to the output shaft 74 (thereby providing for simultaneous ration of the cinch member 101 and the output shaft 74) and the cinch cam 110 can be coupled so as to freely rotate about the output shaft 74. In this manner it is the cinch member 101 that drives rotation of the cinch cam 110 about the longitudinal axis. As such, the cinch member 101 drives movement of the cinch cam 110 via slot 137 in the cinch cam 110. The cinch member 101 is coupled to the output shaft and configured for rotation about the longitudinal axis, the cinch member 101 having the first lever arm 102 for contacting and manipulating movement of at least one of the plurality of latch components 23 and the second lever arm 108 for contacting and manipulating movement of the cinch cam 110 about the longitudinal axis. In this example the cinch member 101 is affixed to the output shaft 74 such that the output shaft 74 and the cinch member 101 simultaneously rotate together about the longitudinal axis in both the first direction 99 and the second direction 99. Further, the cinch cam 110 is mounted on the output shaft 74 to provide for relative rotational movement between the output shaft 74 and the cinch cam 110.

Alternatively, for example, the cinch cam 110 can be affixed to the output shaft 74 (thereby providing for simultaneous ration of the cinch cam 110 and the output shaft 74) and the cinch member 101 can be coupled so as to freely rotate about the output shaft 74. In this manner it is the cinch cam 110 that drives rotation of the cinch member 101 about the longitudinal axis.

Other features of the actuated cinch latch mechanism 12 can include the cinch lever 21 mounted on a shaft of the latch 10 facilitating pivotal movement of the cinch lever 21 between a first position representing the partially closed latch position (see FIG. 8) and a second position representing the fully closed and cinched position (see FIG. 5), such that the shaft is connected to the second frame portion 14*b* and shared by at least another component of the plurality of latch components 23. One example of this is where the at least another component 23 is the pawl 25 mounted on the shaft 26. Further, the biasing element (e.g. element 48) can be coupled to the output shaft 74, the biasing element for providing a bias to the cinch lever 21 towards a position associated with the partially closed latch position. Further, material of the first frame portion 14*a* can be integral with material of the second frame portion 14*b*. Alternatively, the first frame portion 14*a* can be connected to the second frame portion 14*b* via mechanical fastening (not shown).

Referring to FIG. 7, shown is the latch 10 in a fully open position, such that the mating latch component 7 is released from the ratchet 24 and thus out of the slot 3. In this diagram, the mating latch component 7 can be travelling away 138 from the slot 3 thus signifying further opening of the closure panel 6 (see FIG. 1*a,b*). Alternatively, the mating latch component 7 can be travelling towards 140 the slot 3 thus signifying closing of the closure panel 6 (see FIG. 1*a,b*).

Figure 8:
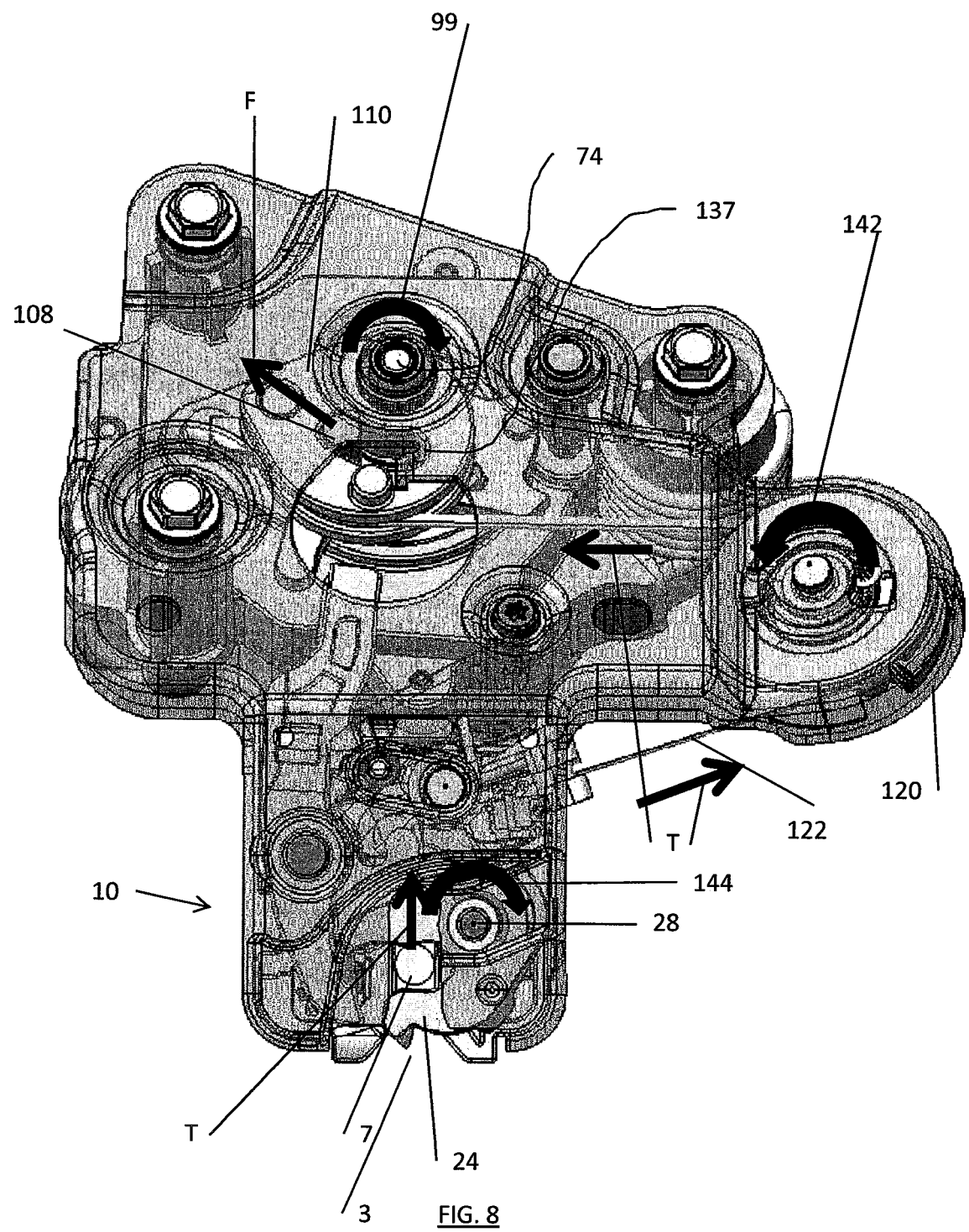
FIG. 8 shows the powered cinch latch mechanism of FIG. 2 in a secondary latch position.
Figure 10:
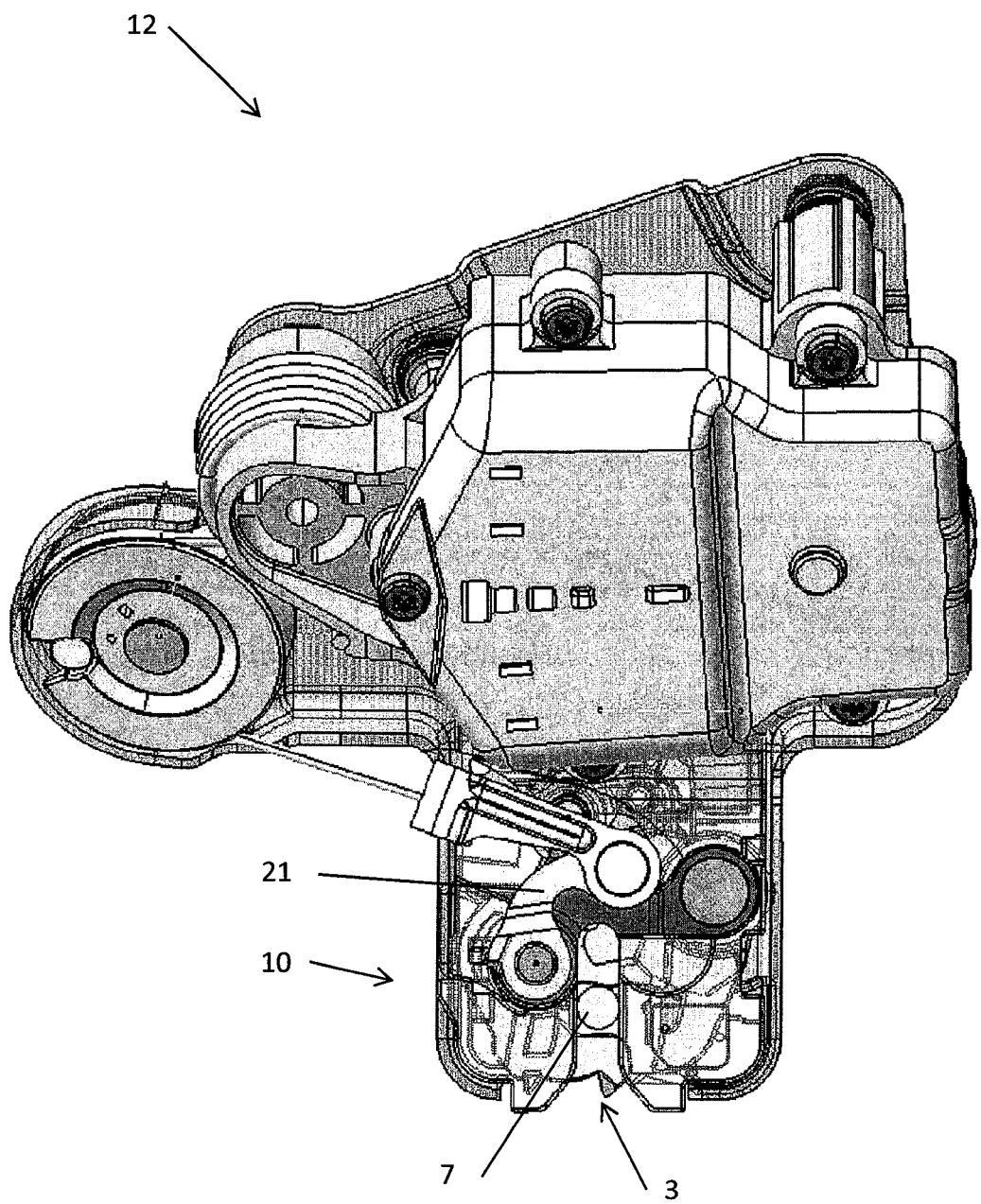
FIG. 10 shows an alternative view of the powered cinch latch mechanism of FIG. 2 in the secondary latch position.

Referring to FIG. 8 and FIG. 10. The cinch lever 21 is in the uncinched position, and the mating latch component 7 is in the partially closed (or open depending on travel direction of the mating latch component 7 in the slot 3) latch position, also referred to as secondary latched position of the latch 10. As the cinch cam 110 is rotated 99 about the longitudinal axis of the output shaft 74, via force F of lever arm 108 against slot 137, tension T in the cable 122 causes pulley 120 to rotate 142, which causes movement of the cinch lever 21 and therefore rotation 144 of the ratchet 24 causing the mating latch component 7 to be forced in direction D towards the fully closed and cinched position, also referred to as primary latch position (i.e. whereby the closure panel 6 is fully closed and any seals about the opening 13—see FIG. 1*a,b*—are sandwiched between the closure panel 6 and the body 5 of the vehicle 4). For an example of the primary position, see FIG. 5 or 6.

Figure 11:
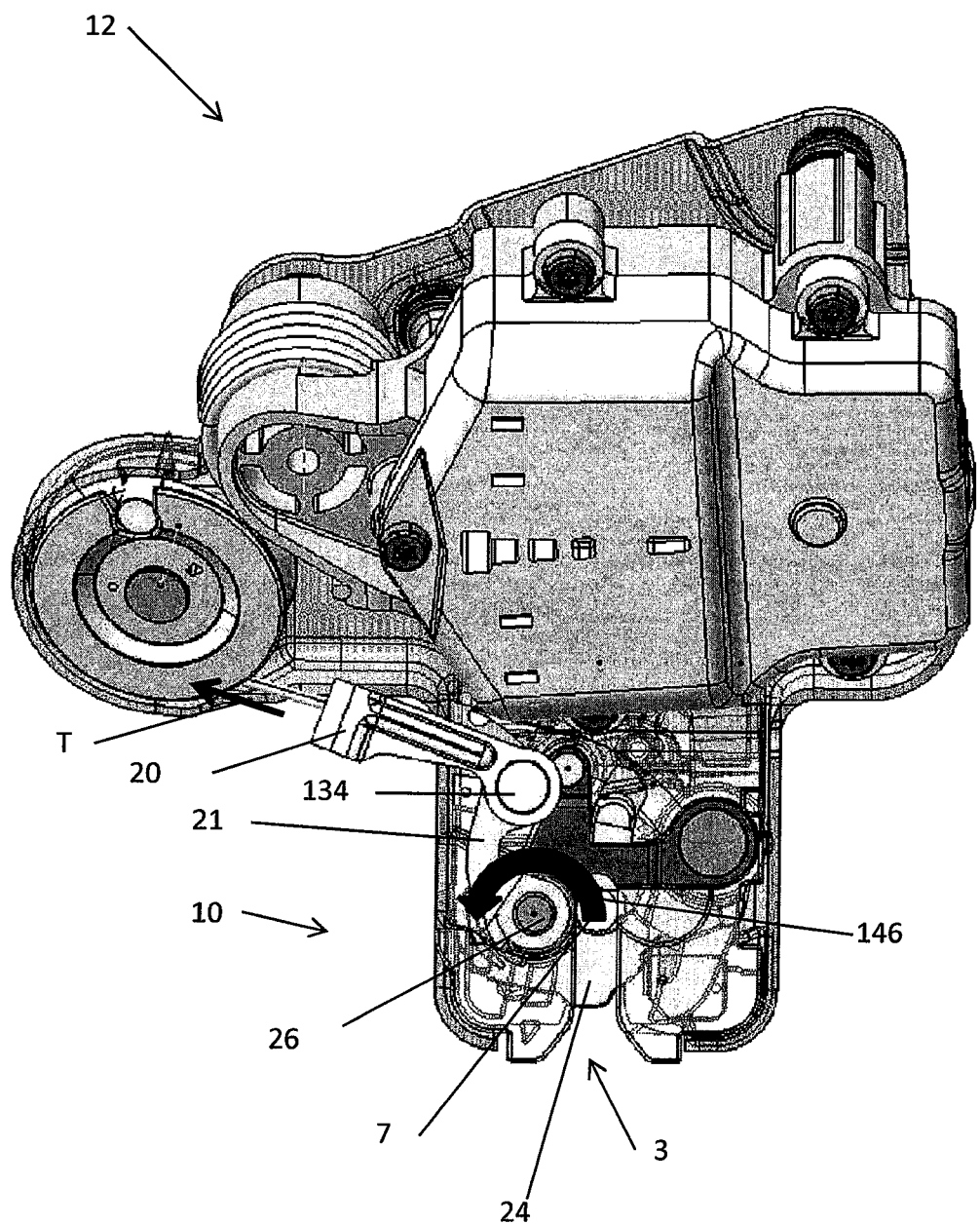
FIG. 11 shows operation of the cinch components of the latch of FIG. 2.

Referring to FIG. 11, shown is the mating latch component 7 travelling towards the cinched or primary latch position due to the continued tension T acting on the cinch lever 21 via the optional intermediate member 20. It is recognized that the cinch lever 21 could also be referred to as the member 20 if the optional member 20 is absent. As such, the tension T causes the member 20 to pull the cinch lever at pivot connection 134, thus causing movement 146 of the cinch lever 21 (e.g. pivot about shaft 26) and therefore further rotation of the ratchet 24 (e.g. via detents 54,56—see FIG. 5) to force the mating latch component 7 further into the slot 3 towards the primary latch position.

Figure 12:
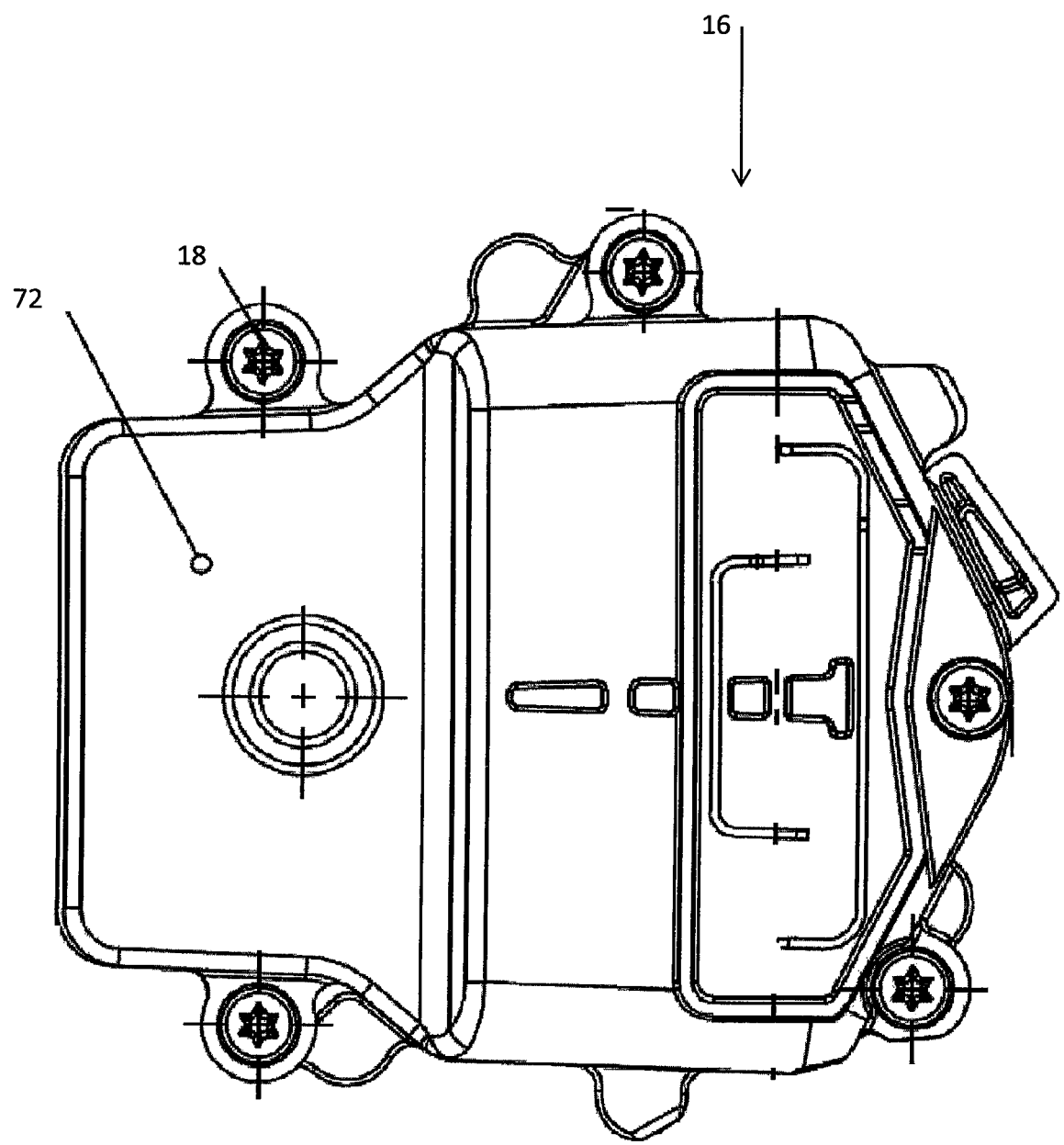
FIG. 12 shows a top view of an alternative embodiment of the rotary actuator system of FIG. 2.

Referring to FIG. 12 is a further embodiment of the rotary actuation system 16 of the power latch system 12 (e.g. including the linkage 22 coupling the rotary actuator system 16 to the latch 10—for example see FIG. 2). It is recognized that the embodiment of FIG. 12 does not include frame 14, as is shown in the alternative embodiment of FIG. 2. As such, it is recognized that the rotary actuator system 16 of FIG. 12 can be provided as an individual component of a generic power latch system 12, as desired. The power latch system 12, as actuated by the rotary actuator system 16, is configured for actuating the operation of the latch 10. In this manner, the power latch system 12 can be used to forcefully provide, during deployment, some form of force assisted open operation (e.g. full open, partial open, etc.) of the closure panel 6 and/or some form of force assisted close operation (e.g. full open, partial open, etc.) of the closure panel 6 shown in FIG. 1*a*. Alternatively, the power latch system 12 can also be used to forcefully provide, during deployment, some form of force assisted recline operation of a seat 100 shown in FIG. 13.

Referring to FIGS. 1*a* and 12, shown is the rotary actuator system 16 having the housing 73. The rotary actuator system 16 can be coupled to the body 5 (or to the seat 100—see FIG. 13) via frame mounting portions 18 (e.g. mounting holes, mounting pins, etc.). The rotary actuator system 16 of FIG. 12 can be coupled to the member 20 of the latch 10 (e.g. as shown in FIG. 2) via the linkage 22 (e.g. pulley and cable system as shown in FIGS. 2 and 3) and also to one or more latch components 23 (e.g. ratchet 24 and/or pawl 25 as further described below see FIG. 3). As such, the member 20 can be actuated (e.g. pulled) by the linkage 22 to operate the closure panel 6, seat 100, etc. from a partially closed position to a fully closed position, as the cinch arm 20 can be coupled to the ratchet 24 via a cinch lever arm 21 (see FIG. 5). It should be recognized that the latch 10 can be mounted to the rotary actuator system 16 using frame 14 as shown or the latch 10 can be mounted stationary and spaced apart from the rotary actuator system 16 by mounting both the latch 10 and the rotary actuator system 16 to a common component (e.g. body 5 see FIG. 1*a* or seat 100 see FIG. 13) of the vehicle. As such it is recognized that the rotary actuator system 16 and the latch 10 can be assembled on the vehicle without use of the frame 14 as shown in FIG. 2.

Figure 14:
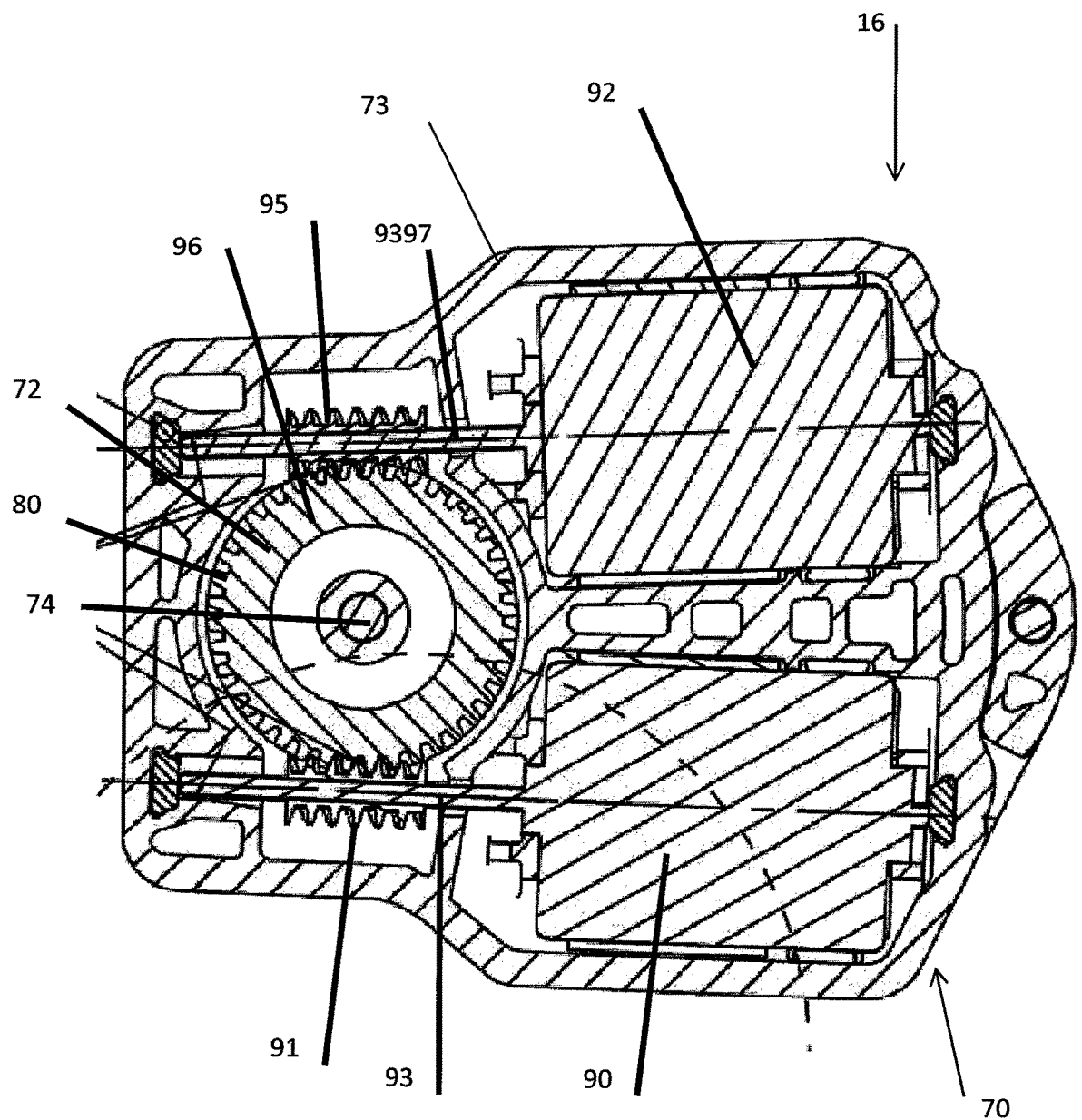
FIG. 14 shows a bottom view of the alternative embodiment of the rotary actuator system of FIG. 12.

Referring FIG. 14, the rotary actuation system 16 includes one or more motors 70 positioned in the housing 73 and coupled to the drive shaft 74. The drive shaft 74 is coupled to a back drive biasing element 48 (see FIG. 15), which can be connected to the driveshaft 74 via the back drive element 76 (e.g. gear). The back drive biasing element 48 biases the cinch lever 21 (and thereby the ratchet 24—see FIG. 5 as an example) towards the un-cinched position 102 (see FIG. 15 with biasing element 48 in regular view), while operation of the motor(s) 70 actuate(s) the position of the ratchet 24 towards the cinched position 104 (see FIG. 15 with biasing element 48 extended in tension in ghosted view) due to corotation of the cinch lever 21 and ratchet 24 about the shaft 28. For example, a coupling element 78, such as splines (see FIG. 4), on the shaft 74 cooperate with the mating coupling element 80, such as gear teeth, on the back drive element 76, such that rotation of the back drive element 76 as driven by the bias of the back drive biasing element 48 causes rotation of the drive shaft 74 and thus return of the ratchet 24 to the un-cinched position via the cinch linkage system 22.

Figure 15:
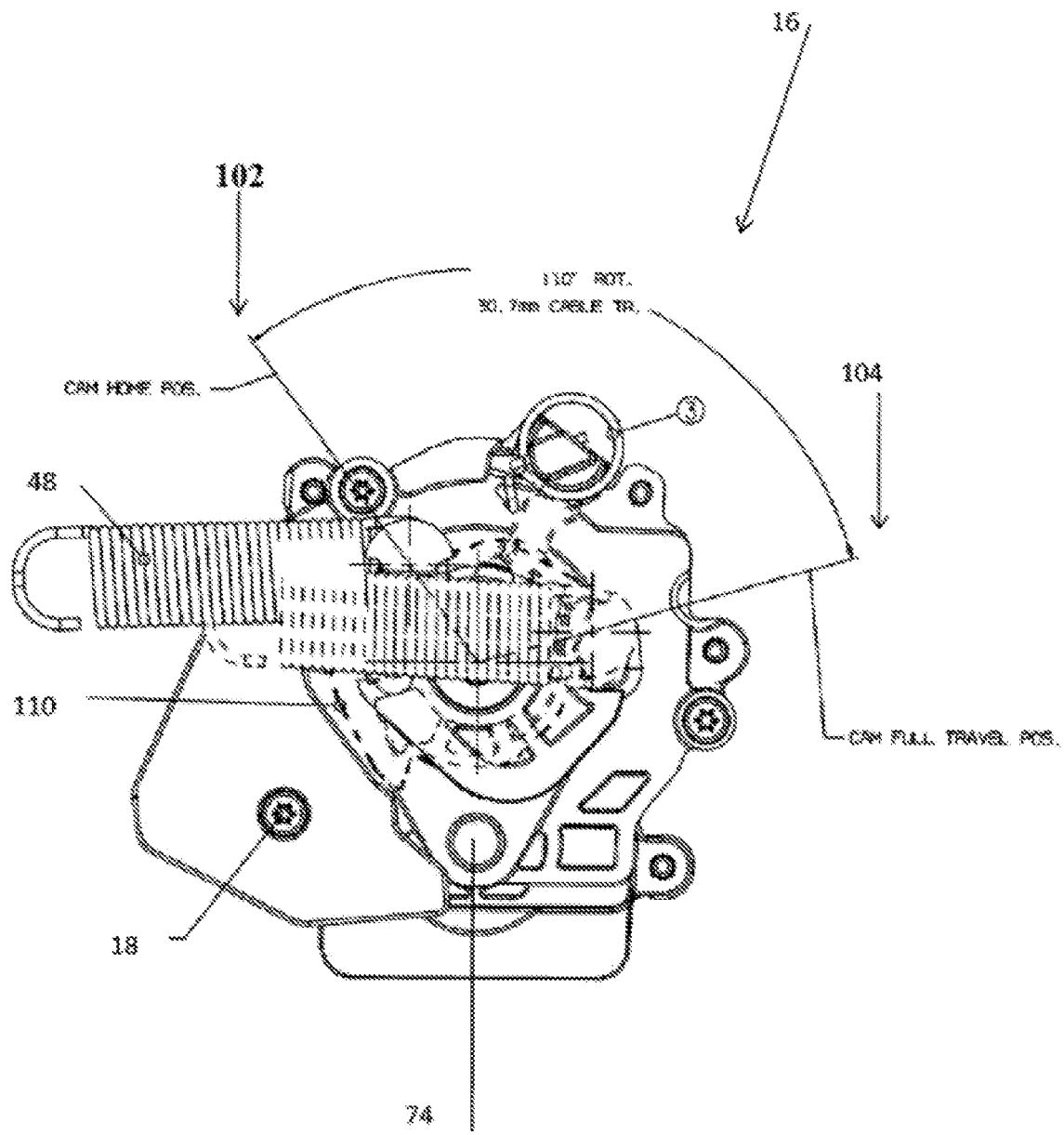
FIG. 15 shows a further top view of the alternative embodiment of the rotary actuator system of FIG. 12.

Referring to FIG. 14, shown is the embodiment of the rotary actuator system 16 including a plurality of motors 70 (e.g. dual motor). As shown, the rotary actuator system 16 includes two electric motors 90 and 92. A control circuit 94 (see FIG. 15) controls energization of the motors 90,92. The control circuit 94 can include, for example, a simple switch, or more complex arrangement providing pinch resistance, express open/close, etc. Motor 90 has the first rotary drive element 91 (e.g. worm gear) disposed about its output shaft 93 which engages the common rotary drive element 96 (e.g. spur gear) attached to the drive shaft 74, such that the common rotary drive element 96 drives the drive shaft 74 under influence of driven rotation of one or more of the motors 90,92. It is recognized that in the event of failure of one of the motors 90,92, the other operational motor 90,92 can be used to drive the drive shaft 74 while the failed motor 90,92 remains coupled to the drive shaft 74. The drive shaft 74 is provided in a driving relationship to the mechanism to be driven, e.g. the linkage system 22 (see FIG. 2). The linkage system 22 can include, for example, a cable and pulley mechanism as described. Motor 92 has the second rotary drive element 95 (e.g. worm gear) disposed about its output shaft 97 which engages the common rotary drive element 76 (e.g. spur gear) attached to the drive shaft 74. For example, as shown in FIGS. 3 and 4, the linkage system 22 can include a pulley 120 and cable 122, such that the cable 122 couples rotation of cinch cam 110 to movement of cinch lever 21. It is recognized that the linkage system 22 could optionally include the pulley 120, as desired. For example, the cable 122 could be connected directly between the cinch cam 110 and the cinch lever 21 without an intermediate pulley or, the cable 122 could be connected indirectly between the cinch cam 110 and the cinch lever 21 via an intermediate pin or series of cable guides as is known in the art (not shown). It is recognized that an embodiment of the cinch cam 110 is shown in FIG. 15 connected to the drive shaft 74.

Figure 13:
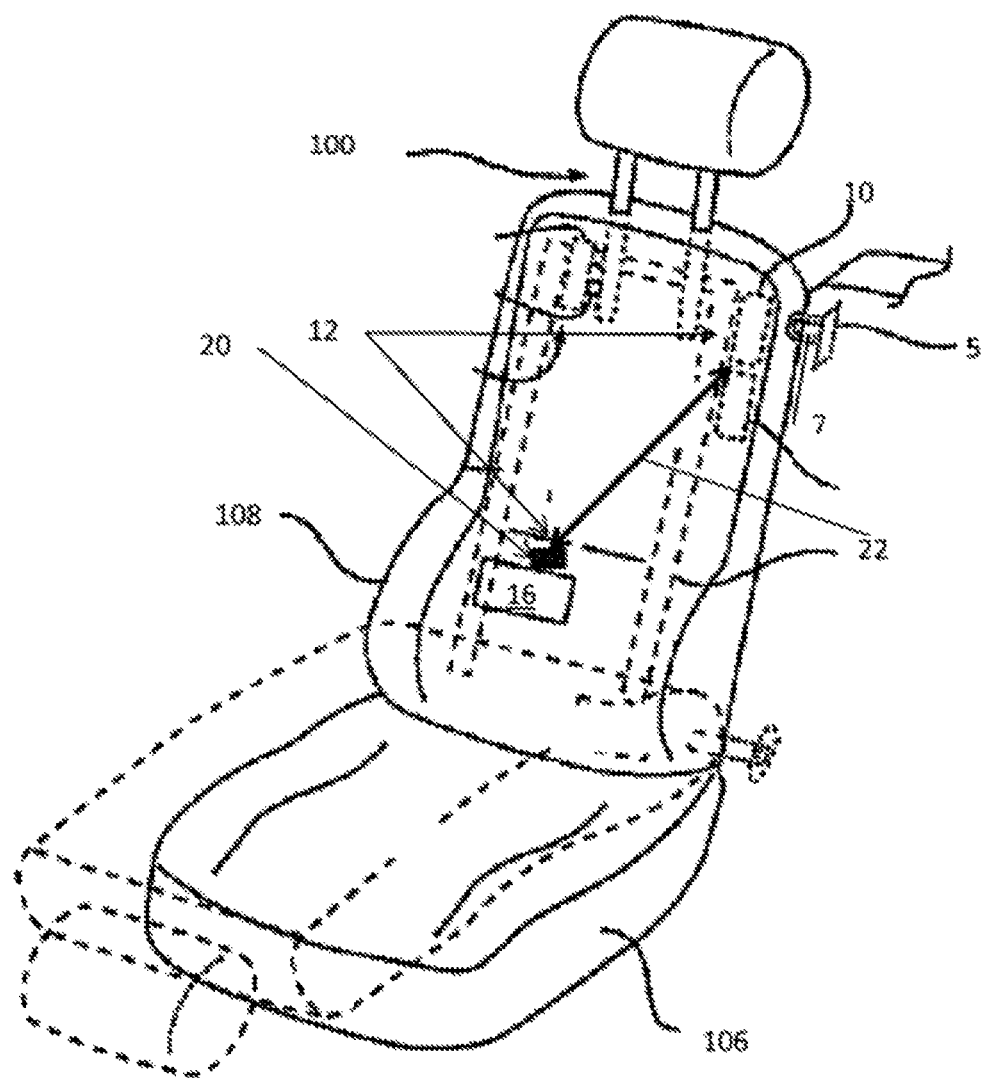
FIG. 13 shows an alternative application of the powered cinch latch mechanism of FIG. 2 or 12.

Referring to FIG. 13, shown is the vehicle seat 100 as an example application of the power latch system 12. The power folding seat 100 can be disposed within an automobile, for example. The power folding seat 100 comprises a seat cushion 106 and a seat back 108. The seat back 108 has a base which is disposed above the seat cushion 106 and is pivotally coupled at its base to the seat cushion 106 to allow the seat back portion 108 to rotate about its base between an upright position and a folded position overlying the seat cushion 106 as shown in phantom. The seat back 108 preferably can include an adjustable head restraint which can be vertically movable between an extended position and a retracted position. The seat back portion 104 can also includes a mounted rotary actuator system 16 disposed between frame members and coupled to the latch 10 (e.g. non cinch version) by the linkage system 22.

Referring again to FIGS. 13 and 14, when both the electric motors 90 and 92 are energized via control circuit 94, drive elements 91,95 both independently drive the common drive element 96 and thus the drive shaft 74, thus causing the linkage system 22 to be operated and thus manipulate the attached release member 20. As further discussed below, manipulation of the release member 20 provides for rotation of the ratchet 24 about the shaft 28 towards and into the open position, thus positioning the mating latch component 7 in the fully open position in the slot 3 of the latch 10 (see FIG. 5). Since the two motors 90 and 92 do not share the same drive elements 91,95 (i.e. each of the motors 90,92 has their own drive respective element 91, 95), the motors 90,92 can be controlled on different circuits of the control circuit 94 and can produce variable speed and torque rotary output or other power distribution arrangements. For example, the motors 90,92 can be configured so that the inherent torque ripple of the motors 90,92 is out of phase with one another. This can reduce or cancel actuator vibration and hum inherent in a single motor 90,92. Meaningful variations can be achieved by combining multiple motors 90,92 on either parallel drive trains or connecting the motors in series, along with any combination of clutch devices, as desired. In addition, multiple motors 90,92 on a common drive shaft 74 can provide a soft failure mode in the event that one motor fails. The remaining motor(s) can provide basic function at a reduced performance level until service can be performed. A further advantage of using multiple motors 90,92 coupled to a common drive shaft 74 is that a more compact design of the housing 72 (see FIG. 4) can be achieved due to the smaller footprint of the side by side motor 90,92 arrangement over that of a conventional single larger motor. Further, coupling of the motors 90,92 to a single drive shaft 74 provides for a single back drive biasing element 48 and back drive element 76 arrangement, via the common drive element 96, thus advantageously providing for efficiencies in back drive system component usages and packaging (e.g. simpler footprint). The drive shaft 74 is coupled at one end to the common drive element 96 (as driven independently by the motors 90,92) and is coupled at the other end one or more components of the linkage system 22.

Referring to FIGS. 13, 14, an aspect provided is a power latch release system 12 for a vehicle seat 100 having a rotary drive actuation system 16 for actuating the release of a latch 10, the rotary drive actuation system 16 including: an output shaft 74 for driving the release linkage system 22 via a release member 20 affixed at one end of the output shaft 74; a common drive element 96 affixed to the output shaft 74 at the other end of the output shaft 74; and a plurality of motors 90,92 coupled to the common drive element 96 for simultaneously driving the common drive element 96 and the output shaft 74 in a first rotary direction 99 to effect actuation of the release linkage system 22.

As discussed, the rotary actuator system 16 can be configured to rotate the seat back 108 between the upright position and the folded position. However, as the rotary actuator system 16 is disposed within the seat back 108, the power folding seat 100 can be easily installed into an automobile without occupying space assigned to other automobile components.

The latch 10 (non-cinch latch version components of ratchet and pawl) of the power latch system 12 of FIG. 13 is shown in example detail FIGS. 3 and 5. As shown, the latch 10 has the rotary actuator system 16 mechanically coupled to it via the linkage system 22, and is interoperable with the latching post or striker 7 secured to the body 5 of the automobile. The mechanical seat latch 10 can be of the type commonly found in automobiles and can comprise a spring-actuated latch mechanism and a release pawl (see FIG. 5), e.g. non-cinch version. The mechanical seat latch 10 is configured to release the striker 7 (under influence of the pawl actuated by the rotary actuator system 16 to release the striker 7 upon influence of rotary actuator system 16 operation via linkage 22. Preferably, the rotary actuator system 16 is powered by the electrical system of the automobile.

For example, the rotary actuator system 16 can be coupled to the release pawl of the mechanical seat latch 10 via the release linkage system 22. Consequently, when the rotary actuator system 16 is activated, the release pawl can be rotated away from the spring-actuated latch 10 mechanism, thereby causing the mechanical seat latch 10 to release the latching post 7 and to allow the seat back 108 to be rotated from the upright position to the folded position via a seat recliner mechanism (not shown).

Therefore, it is recognized that the power latch system 12 (and/or any individual components 10,16,22 thereof either alone or in combination with each other) of FIG. 13 can be used as a latch actuation mechanism for seats 100. Alternatively as an example application, the power latch system 12 (and/or any individual components 10,16,22 thereof either alone or in combination with each other) of FIG. 2 can be used as a cinch latch actuation mechanism for closure panels 6.

I claim:

1. An assembled power latch of a vehicle for mounting to a vehicle once assembled, the assembled power latch comprising:
    a latch frame having a first frame portion having a first mounting surface and a second frame portion having a second mounting surface, the second frame portion extending from the first frame portion, wherein the first frame portion is adjacent and integral with the second frame portion;
    a motorized actuation system mounted on the first mounting surface, the motorized actuation system having at least one motor with an output shaft having a longitudinal axis;
    a cinch cam coupled to the output shaft and configured to rotate about the longitudinal axis in a first direction and in a second direction opposite the first direction;
    a latch mounted on the second mounting surface and thereby adjacent to the motorized actuation system, the latch having a plurality of latch components including a cinch lever for operating the latch from a partially closed latch position to a fully closed and cinched position; and
    a linkage system including a cable extending between the cinch cam and the cinch lever, the cable coupling rotational movement of the cinch cam to movement of the cinch lever;
    wherein once mounted the latch and the motorized actuation system are in direct abutment and thus in direct contact with one another via the linkage system;
    wherein the latch frame of the assembled power latch is mounted to the vehicle once assembled, the vehicle including a vehicle body and closure panels of the vehicle.

2. The assembled power latch of claim 1, wherein the motorized actuation system further includes a back drive biasing element coupled to the output shaft, such that back drive biasing element biases the output shaft in second rotary direction opposite the first rotary direction.

3. The assembled power latch of claim 2, wherein the back drive biasing element is coupled to the output shaft by a gear and the back drive biasing element is a spring.

4. The assembled power latch of claim 1, wherein the motorized actuation system is a rotary drive actuation system.

5. The assembled power latch of claim 1, wherein the motorized actuation system includes a plurality of motors.

6. The assembled power latch of claim 5, wherein the motorized actuation system further includes a common drive gear affixed to the output shaft and each of the plurality of motors is coupled independently to the common drive gear by a respective gear attached to a respective drive shaft of the plurality of motors.

7. The assembled power latch of claim 5, wherein the plurality of motors are mounted side by side in a common housing.

8. The assembled power latch of claim 5, further including a cinch member affixed to the output shaft for corotation of the cinch member and the output shaft when driven by at least one of the plurality of motors.

9. The assembled power latch of claim 1, wherein the cinch cam has a mounting portion for coupling a cable thereto, the cable is part of linkage system coupled to a latch component of the latch.

10. The assembled power latch of claim 1, wherein the second frame portion extends from the first frame portion at an acute angle as measured between the mounting surfaces, such that the frame is an angled frame.

11. The assembled power latch of claim 1, further comprising a pulley mounted to the latch frame, the pulley guiding the cable in an indirect path between the cinch cam and the cinch lever.

12. The assembled power latch of claim 11, wherein the pulley is mounted on the first frame portion about a pivot point.

13. The assembled power latch of claim 11, wherein a first cable portion of the cable is between the cinch cam and the pulley and a second cable portion of the cable is between the pulley and the cinch lever, such that the first cable portion of the cable and the second cable portion of the cable are non-parallel with respect to one another.

14. The assembled power latch of claim 11, wherein a first cable portion of the cable is between the cinch cam and the pulley and a second cable portion of the cable is between the pulley and the cinch lever, such that the first cable portion of the cable and the second cable portion of the cable are non-coplanar.

15. The assembled power latch of claim 1, wherein the first frame portion is materially integral with the second frame portion.

16. The assembled power latch of claim 1, wherein the latch frame includes frame mounting portions for coupling the power latch to either the vehicle body or a closure panel of the closure panels the vehicle.

17. The assembled power latch of claim 1, wherein the latch frame is directly mounted to either vehicle body or a closure panel of the closure panels of the vehicle, and wherein the motorized actuation system, the latch, and the cinch cam are directly mounted to the latch frame.

18. The assembled power latch of claim 17, wherein the latch frame is mounted to either the vehicle body or a closure panel of the closure panels of the vehicle as a single unit.

19. A method for mounting of an assembled power latch to a vehicle, the method comprising:

providing a latch frame having a first frame portion having a first mounting surface and a second frame portion having a second mounting surface, the second frame portion extending from the first frame portion, wherein the first frame portion is adjacent to and integral with the second frame portion;

prior to said mounting of the assembled power latch to the vehicle, assembling the assembled power latch by:

mounting a motorized actuation system on the first mounting surface, the motorized actuation system having at least one motor with an output shaft having a longitudinal axis, the output shaft having a cinch cam coupled to the output shaft and configured to rotate about the longitudinal axis in a first direction and in a second direction opposite the first direction; and mounting a latch on the second mounting surface to provide as adjacent to the motorized actuation system, the latch having a plurality of latch components including a cinch lever for operating the latch from a partially closed latch position to a fully closed and cinched position; and providing a linkage system including a cable extending between the cinch cam and the cinch lever, the cable coupling rotational movement of the cinch cam to movement of the cinch lever, such that once mounted the latch and the motorized actuation system are in direct abutment and thus in direct contact with one another via the linkage system; and providing said mounting of the assembled power latch by mounting the latch frame of the assembled power latch to the vehicle, the vehicle including a vehicle body and closure panels of the vehicle.

20. The method of claim 19, wherein a vehicle location of said mounting the latch frame is the vehicle body.

21. The method of claim 19, wherein a vehicle location of said mounting the latch frame is a closure panel of the vehicle.

\* \* \* \* \*